United States Patent [19]
Nakata et al.

[11] Patent Number: 5,513,893
[45] Date of Patent: May 7, 1996

[54] UNDERFLOOR STRUCTURE FOR AUTOMOBILE

[75] Inventors: Moritsune Nakata, Yokohama; Masatoshi Aoki, Yokasuka, both of Japan

[73] Assignee: Nissan Motor Co., Ltd., Kanagawa, Japan

[21] Appl. No.: 291,807

[22] Filed: Aug. 17, 1994

[30] Foreign Application Priority Data

Aug. 23, 1993 [JP] Japan ........................... 5-207675
May 17, 1994 [JP] Japan ........................... 6-102880

[51] Int. Cl.$^6$ .................................................. B62D 35/02
[52] U.S. Cl. ..................... 296/180.1; 296/208; 180/68.2; 180/903
[58] Field of Search ................... 296/180.1, 208; 180/68.1, 68.2, 903

[56] References Cited

U.S. PATENT DOCUMENTS 5,322,340  6/1994  Sato et al. ........................ 296/208 X

FOREIGN PATENT DOCUMENTS

| | | | |
|---|---|---|---|
| 3613303 | 7/1987 | Germany | 296/180.1 |
| 3712048 | 10/1988 | Germany | 296/180.1 |
| 60-105526 | 7/1985 | Japan . | |
| 275221 | 11/1989 | Japan | 180/68.1 |
| 231816 | 7/1944 | Switzerland | 180/68.1 |
| 552153 | 3/1943 | United Kingdom | 180/68.1 |

*Primary Examiner*—Dennis H. Pedder
*Attorney, Agent, or Firm*—Lowe, Price, LeBlanc & Becker

[57] ABSTRACT

An underfloor structure for automobile capable of reducing aerial resistance under a floor of the automobile and improving its cooling capability against heat-radiant parts such as break units, a transmission etc. The underfloor structure includes an undercover for closing an underside of a high-pressure section. The undercover consists of a pair of ducts which communicates with the high-pressure section to thereby discharge heated air contained therein toward rear wheels of the automobile and a narrow part which is arranged between the discharging parts to narrow an air flow flowing from a front of the automobile along an underside of the undercover. In one form of the ducts, they are formed so as to face lateral sides of the automobile, respectively.

15 Claims, 23 Drawing Sheets

POSITION TO MEASURE WIND
VELOCITY ABOUT DIFFERENTIAL

UNDERFLOOR STRUCTURE FOR AUTOMOBILE

BACKGROUND OF THE INVENTION

1. Field of the Invention

This invention relates to an underfloor structure for an automobile.

2. Description of the Related Art

Conventionally, there is known an underfloor structure for an automobile, the aerodynamics of which can be improved by flattening the underfloor. FIG.1 shows a plan view of the above-referenced underfloor structure. In the figure, reference numeral 1 designates a vehicle body of the automobile and 3 a center floor. A floor tunnel 4 is arranged at intermediate of the center floor 3 to extend from a front side of the vehicle body 1 through a rear side thereof. Along a direction extending from the floor tunnel 4 through a rear floor 6, a transmission 5, a drive shaft 8 and a rear differential gear 7 are arranged in order. In order to smooth an underside of an engine room 10 as possible, a flat undercover 113 closes a lower opening of the engine room 10 which is defined by a left front wheel housing 9, a right front wheel housing 9 and a dash lower panel 11, whereby a velocity of air flow flowing underfloor is increased to reduce the resistance of the air and the lifting force.

When the lower opening of the engine room 10 is closed by the undercover 113, the discharged heated air passing through a radiator (not shown) may stay in the engine room 10, and then the temperature and pressure in the engine room 10 will tend to rise. Consequently, most of the known undercovers 113 have a large number of louvers 113a for discharging the heated air staying in the engine room 10. This underfloor structure is disclosed in Japanese Utility Model Laid Open (Kokai) No.60-10552, for example.

In the conventional structure mentioned above, however, since an air flow of a low flow rate, i.e., a slow stream (current) is discharged from almost all area of the undercover 113 through the louvers 113a, an air flow of a high flow rate, i.e., a rapid stream flowing from a front of the vehicle body 1 is decelerated under the undercover 113 by the slow stream discharged through the louvers 113a. Therefore, a velocity distribution of the streams flowing under the center floor 3 and the rear floor 6 is as shown with U11, U12, U13 and U14 of FIG.1 in which a length of each arrow therein corresponds to the velocity of each stream. The distribution suggests that the velocity is lowered at the center of the floor in a direction of width of the vehicle.

According to our wind tunnel experiment under a vehicle speed of 120 km/hour, it has been found that the velocity of the cooling wind is relatively low around the transmission 5 and the rear differential gear 7 both of which constitute so-called "heat-radiant parts" existing under the floor, whereby they cannot be cooled down sufficiently. On the contrary, since the rapid stream, which is flowing under side floors arranged on both sides of the vehicle, strikes against rear wheels 15 directly, the aerial resistance is increased around the rear wheels 15. Furthermore, such a distribution of velocity involves a phenomenon where a lifting force acting on the rear wheels 15 is larger than that acting on the front wheels 19, so that the driving stability would be influenced because of its inequilibration.

Further, in case of traffic retardation, since the heated air discharged from the engine room 10 through the louvers 113a is apt to stagnate around of the undercover 113 without flowing backward, there is a possibility that the heated air discharged from the engine room 10 may be sucked into the radiator again.

Under the above-mentioned circumstances, in order to reduce the above-mentioned aerial resistance against the wheels and to increase the cooling effect of the air flow on the heat-radiant parts existing under the floor, we have already proposed an underfloor structure consisting of an undercover 213 as shown in FIG. 2 in Japanese Patent Application Serial No.4-138440 (not published).

In order to control one air flow discharged from a front high-pressure area of the vehicle and the other air flow flowing under the undercover 213, it includes a pair of ducts 217 arranged at a rear part thereof and a narrow part 221 arranged between the ducts 217 to narrow the latter air flow.

In operation, the former air flow through the ducts 217 is decelerated and divided into two slow streams U3 flowing to the rear wheels 15, respectively, as shown in FIGS. 3 and 4. Therefore, the aerial resistance acting on the rear wheels 15 can be reduced in comparison with the resistance in case of rapid streams. On the other hand, the latter air flow flowing from the narrow part 221 along a center line of the vehicle is accelerated by its throttle effect and changed to a rapid stream U2. Consequently, due to this speeded-up air flow, it is possible to improve the cooling effect of the air flow on the heat-radiant parts positioned under the floor of the vehicle.

However, the above-mentioned underfloor structure still contains some problems to be solved.

First, as indicated by arrows in FIG. 3, the air flow from the vehicle front is throttled by clearances between the respective slow streams U3 discharged from the ducts 217 and the front wheels 19. Consequently, the air flow passing through the clearances is so accelerated that areas C of a high velocity are formed behind the front wheels 19, whereby the aerial resistance is increased due to the unevenness of the vehicle. Further, since this air flow, which is usable for cooling front brake units primarily, escapes sidewardly of the vehicle without striking the front brake units, the cooling operation thereon cannot be effected sufficiently.

Second, in the area B where the rapid stream U2 narrowed by the narrow part 221 is flowing, an air pressure (a negative pressure) is raised or recovered by a diffusion of the slow streams U3 in the areas A beside the area B. Therefore, the rapid stream U2 cannot be produced in the neighborhood of the rear differential gear 7 as one of the heat-radiant parts, so that it cannot be cooled effectively.

Third, since the rapid stream U2 after passing through the narrow part 221 flows apart from the transmission 5 relatively as shown in FIG.4, the air flow for cooling side surfaces of the transmission 5, which is also one of the heat-radiant parts, cannot be ensured sufficiently.

SUMMARY OF THE INVENTION

It is a principal object of the present invention to provide an underfloor structure for automobile, which is capable of reducing the aerial i.e., air or wind, resistance under the floor by controlling the air flow thereunder, while improving the capability of cooling heat-radiant parts of the vehicle, such as the brake units, the transmission unit, the differential gear unit, etc.

In order to achieve the above-mentioned object, the present invention provides an underfloor structure for an automobile, comprising:

an undercover for closing an underside of an engine compartment disposed on a front section of said automobile, said undercover having a pair of discharging parts arranged symmetrically of a center line of said automobile, said discharging parts communicating with said engine discharging compartment for a flow of heated air toward rear wheels of said automobile, a narrow part arranged between said discharging parts to narrow an air flow flowing from a front of said automobile along an underside of a floorboard of the automobile thereby discharging the air flow toward a transmission and a rear differential gear located under a floor of said automobile and behind said engine compartment, and at least one air flow control means disposed in a rear part of said undercover for controlling an air flow thereat, said air flow control means consisting of;

means for controlling the heated air flow direction to prevent a pressure rise of an air flow under said automobile guide means for guiding the air flow flowing out from said narrow part to an upward part of an underfloor of said automobile, and preventing means for preventing a separation of the air flow discharged from said narrow part away from the said transmission and said rear differential gear part.

With the arrangement of the underfloor structure including at least one of the control means for controlling a flowing direction of the heated air to prevent a pressure of the air flow flowing under the vehicle floor and in the rear section of the automobile from rising, the guide means for guiding the air flow discharged from the narrow part to shift the direction of the air flow upward and the preventing means for preventing the air flow discharged from the narrow part from separating from the heat-radiant part, it is capable of controlling the air flow under the vehicle floor, whereby the aerial resistance thereunder can be reduced and the capability of cooling the heat-radiant part, such as the brake unit, the transmission, etc., is improved.

In the above-mentioned arrangement, preferably, the pair of discharging parts are formed in such a manner that their outlets face lateral sides of the automobile, respectively. With such an arrangement, an area occupied by slow air streams from the discharging parts is enlarged and shifted outside the vehicle. Correspondingly, an area occupied by rapid air streams flowing behind front wheels of the automobile is reduced considerably, so that an resistance under a center portion of the floor of the vehicle can be decreased. Moreover, since the rapid streams approach front brake units, the cooling capability therefore can be improved.

Further, since the area of the slow streams is shifted toward the outside of the vehicle, a rapid stream flowing along a center line of the automobile can reach up to a rear section of the automobile without increasing the pressure, whereby an improvement in the cooling capability against the heat-radiant part existing on the rear section, such as the transmission, can be effected. Preferably, the pair of discharging parts are provided with inclined sidewalls which are inclined to the lateral sides of the automobile and by which the respective directions of the heated air flowing in the discharging parts can be shifted to the lateral sides. In the arrangement mentioned above, since the outward directional tendency of the heated air can be increased, the air resistance under the vehicle floor can be further decreased and the cooling capability against the heat-radiant parts, such as a rear differential gear, the front brake units etc., can be improved.

More preferably, the pair of discharging parts are provided with control fins for directing the air flow from the discharging parts to the lateral sides of the automobile. With the arrangement, since the outward directional tendency of the heated air is improved because of a wind-regulating effect derived from the control fins, the reduction of the air resistance and the cooling capability against the heat-radiant parts of the vehicle can be improved.

Preferably, the narrow part is provided at a rear end thereof with guide plates which shift the direction of the rapid stream (narrowed by the narrow part) upward. Consequently, the velocity of the wind passing in the vicinity of the heat-radiant part existing upward of the automobile is increased, whereby the cooling capability for that part can be improved.

In the present invention, preferably, the guide plates are provided with at least one of inside edges thereof in a direction of width of the automobile with a partition which extends along a flowing direction of an air flow introduced into the narrow part to separate an air flow flowing upward therefrom from the other air flow in the flowing direction. With the arrangement, it is possible to prevent vortices from generating in the vicinity of the inside edges of the guide plates. In this way, the velocity of the wind flowing under the heat-radiant part is increased, whereby the cooling capability can be improved.

In the present invention, preferably, the underfloor structure is provided with a communication pipe which communicates a space adjacent to the heat-radiant part of high-pressure area with the other space of which air pressure is lower than that of the former space. Consequently, since the pressure of the space adjacent to the heat-radiant part is reduced by the communication, it is possible to increase the tendency of the air flow discharged from the narrow part to direct the heat-radiant part, whereby the heart-radiant part can be cooled effectively.

In the present invention, preferably, the vehicle floor is provided with a floor tunnel which extends in the directions before and behind the automobile and the guide means comprises a central undercover arranged behind the narrow part, the central undercover having an introducing duct for introducing the air flow flowing from the narrow part upward. During vehicle's driving, due to throttle effect at the narrow part, there is produced a relatively rapid stream which flows under the vehicle floor from the front of the vehicle to the rear thereof. This stream, which is of relatively low temperature because of its air flow flowing outside the vehicle, flows under the transmission and the differential along the center line of the vehicle, whereby it allows the transmission and the differential to be cooled efficiently. Furthermore, since the stream is guided upward by the central undercover, it is possible to improve the cooling effects on the heat-radiant part, such as the differential.

In the present invention, the introducing duct has a width narrower than a width of an outlet of the narrow part. Consequently, since the width of the introducing duct is less than the width of the narrow part, it is possible to put the whole introducing duct in the air stream. Therefore, such an arrangement allows the air stream to be produced certainly, whereby it is possible to obtain the cooling effect on the upper face of the differential more assuredly.

Preferably, wherein the central undercover is arranged in such a manner that a level of a front end part thereof is higher or equal to that of a lower face of a transmission arranged behind the engine. With such an arrangement, the air stream flowing beneath the transmission cannot be disturbed by a provision of the undercover, so that the cooling action can be maintained.

In the present invention, preferably, the lower face of the transmission is continuous with a lower face of the central undercover. With such an arrangement, the front end of the central undercover does not disturb a flowing of the air stream under the vehicle floor.

In the present invention, preferably, the introducing duct is shaped to be of NACA (National Advisory Committee for Aeronautics)-duct configuration. With such a configuration of the introducing duct, the air stream, which flows under the vehicle floor from the front side thereof through the rear side, can be guided upward effectively.

Preferably, the floor tunnel is a tunnel which accommodates a driveshaft for transmitting the output of the engine and an air guide is provided for surrounding a part of the driveshaft, against which an air stream guided by the central undercover would strike. With such an arrangement, since the air stream enters into the floor tunnel certainly without being disturbed by the rotation of the driveshaft, the cooling action on the differential can be further effected.

Preferably, the underfloor structure of the invention further comprises a communication pipe for communicating a space in the engine room with a space in the vicinity of side faces of the transmission. With such an arrangement, since the heated air above the engine is discharged into the spaces under the sides of the transmission through the communication pipe, it is possible to prevent the heated air from flowing to the differential. Consequently, the cooling action of the differential can be more effected and the heating action of the heated air discharged from the engine room to the transmission can be restricted.

In the present invention, the introducing duct is provided at a rear end thereof with an air-guide member for controlling the flowing direction of air flow which passes through the introducing duct. With such an arangement, by adjusting the air-guide member, the air flow can be controlled so as to be directed toward the upper face and both side faces of the differential.

DESCRIPTION OF THE PREFERRED EMBODIMENT

Figure 1:
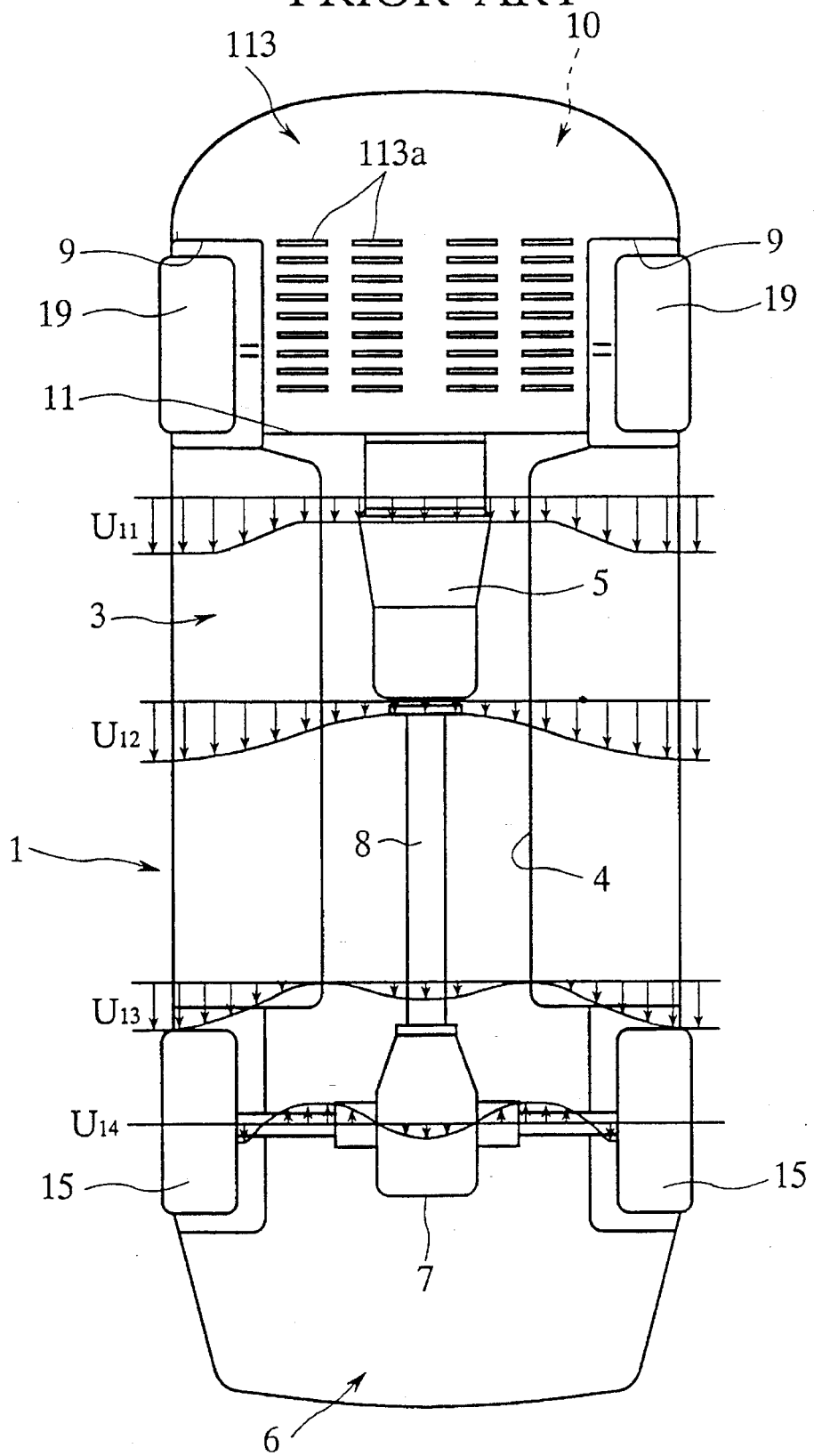
FIG. 1 shows a conventional underfloor structure including a flow-rate distribution of air flows under floors of a vehicle.
Figure 2:
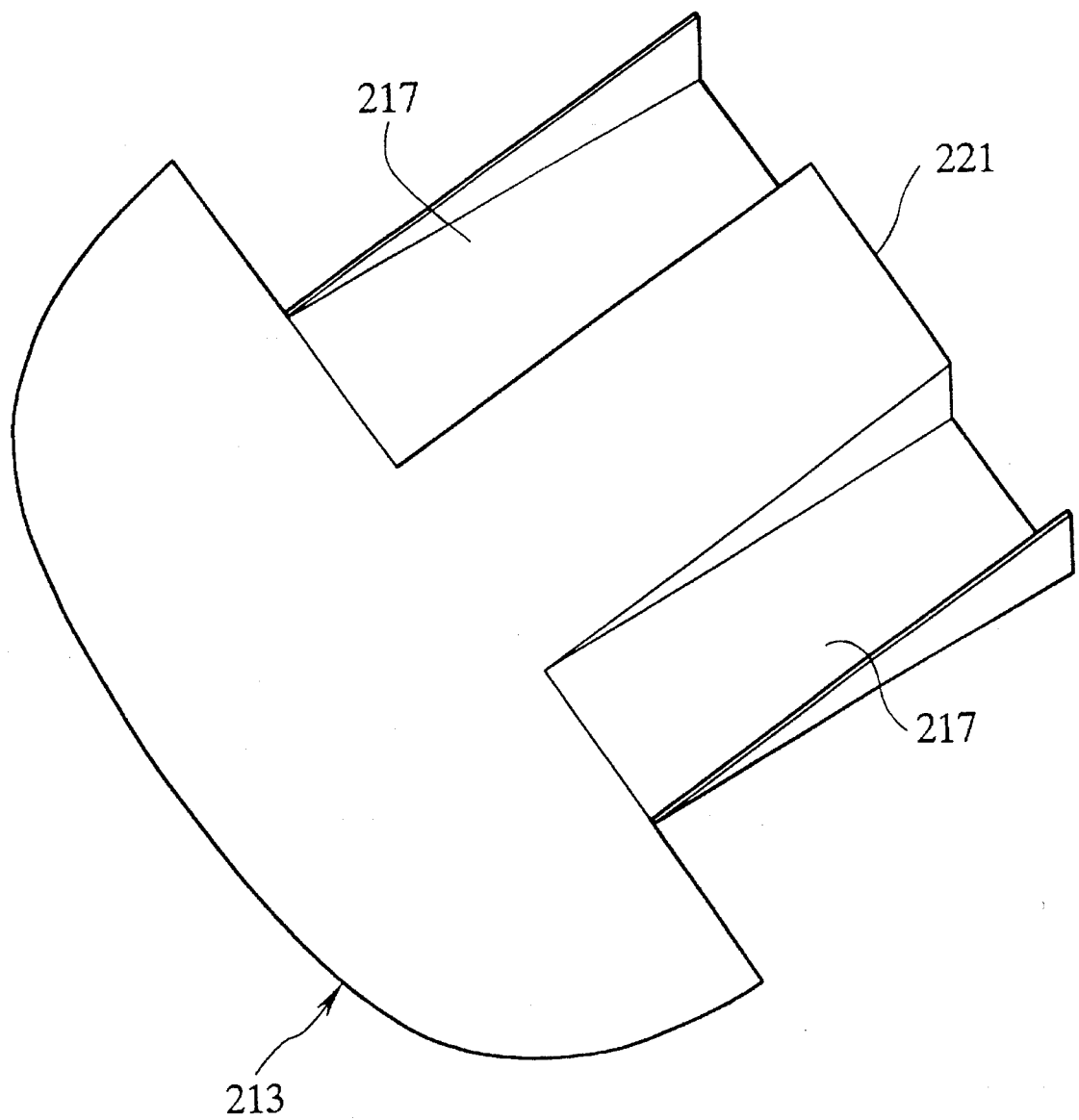
FIG. 2 is a perspective view of an undercover as a constituent of another underfloor structure (not published)

The first embodiment of the present invention is now described with reference to FIGS.5 and 6. Note that, in these figures, elements similar to those of FIGS. 1 to 4 are indicated by the same reference numerals.

A floor tunnel, which is not shown in the figures, is arranged at intermediate of a center floor 3 to extend from a front side of a body 1 through a rear side thereof. Along a direction extending from the floor tunnel through a rear floor 6, a transmission (heat-radiant part) 5, a driveshaft (not shown) and a rear differential gear (heat-radiant part) 7 are arranged in order. A flat undercover 13 closes a lower opening of an engine room 10 which is defined by left and right front wheel housings 9 and a dash lower panel 11. In general, the flat undercover 13 is made of appropriate floor material, such as a resinous material, a steel plate and so on.

The undercover 13 is provided between the left and right front wheel housings 9 with a pair of ducts 17 (corres. discharging parts, control means) which are arranged in symmetry with a center line of the vehicle to discharge the air in the engine room 10 for rear wheels 15. Each of the ducts 17 is so formed as to incline downwardly and sink from an upper surface of the undercover 13 as it approaches the rear end of the undercover 13, as shown in FIG.6. Further, a rear end 17a of the respective ducts 17 is cut obliquely in such a manner that an outlet thereof faces lateral sides of the automobile, respectively.

Arranged between one duct 17a and the other duct 17a is a narrow part 21 which narrows an air flow flowing under the undercover 13 to flow out it toward the heat-radiant parts existing under the center floors 3 and a rear floor 6 (see FIG. 1) etc., such as the transmission 5 and the rear differential gear 7 etc. The narrow part 21 has a width of about ⅓ of a distance between the left and right front wheel housings 9, substantially corresponding to a width of the transmission 5 as a heating spot just behind the narrow part 21.

The above-mentioned undercover 13 operates as follows.

Figure 3:
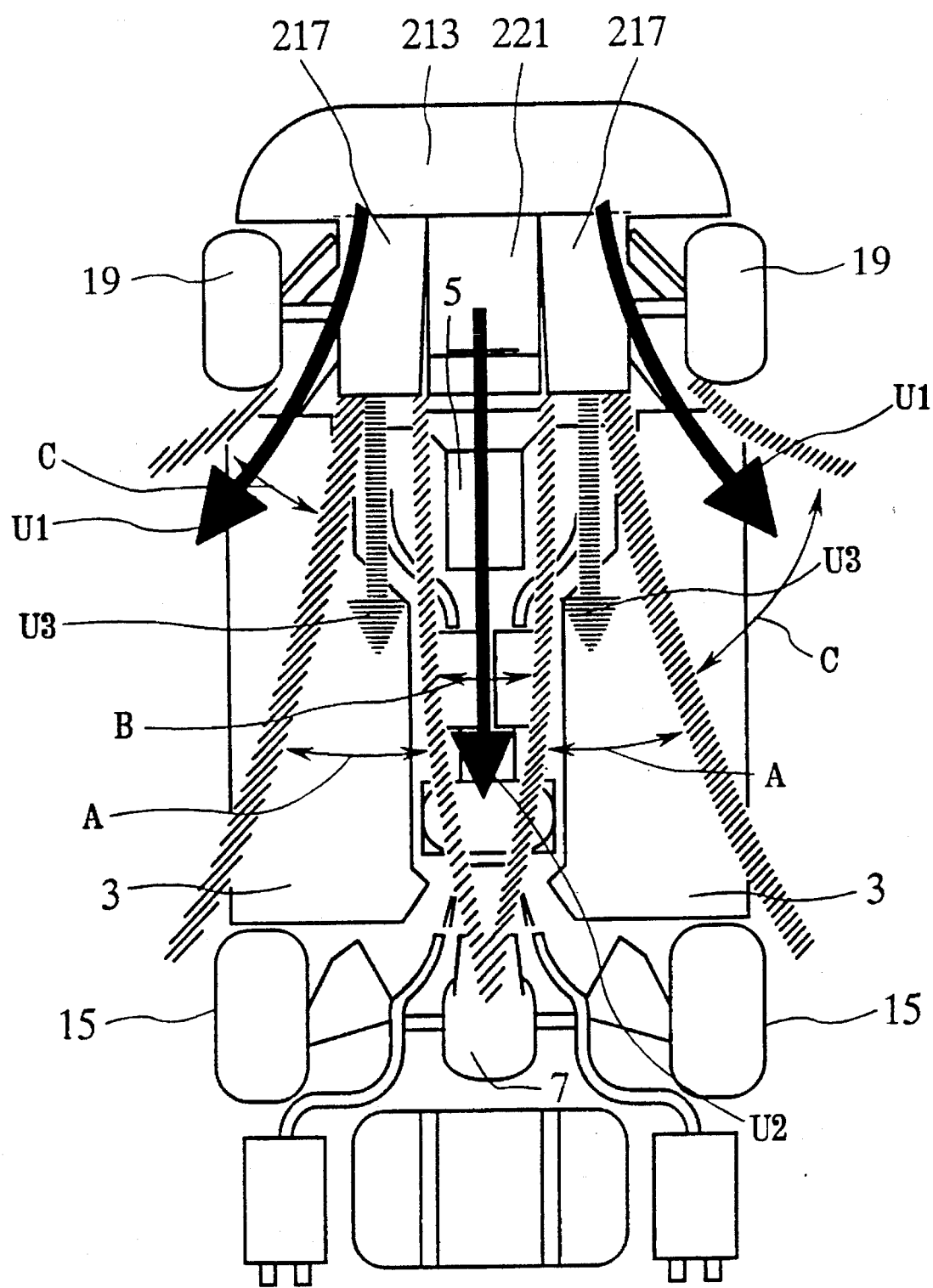
FIG. 3 shows the underfloor structure including the undercover of FIG.2 and a flow-rate distribution of air flows under the structure.
Figure 4:
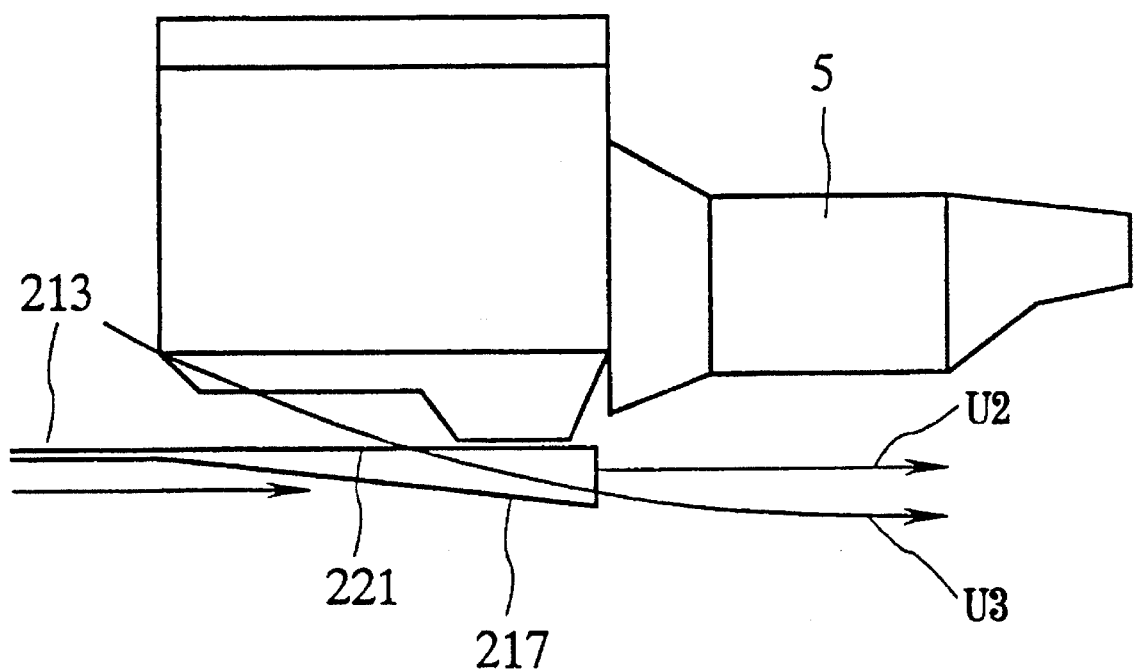
FIG. 4 is a side view of an engine and the undercover of FIG.2, in which air flows passing therethrough are shown.
Figure 5:
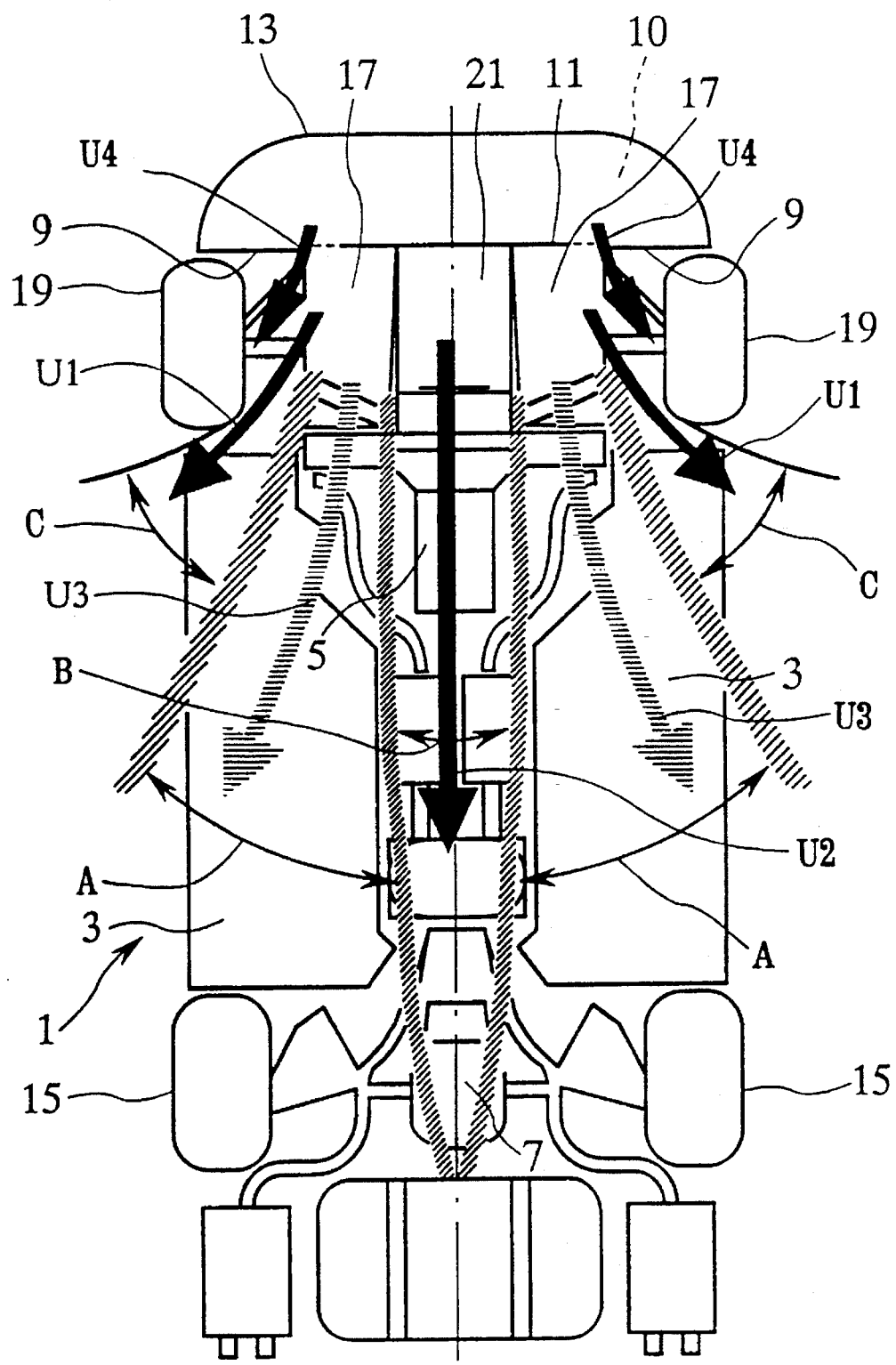
FIG. 5 shows an underfloor structure including a flow-rate distribution of air flows under floors of a vehicle in accordance with a first embodiment of the present invention.
Figure 6:
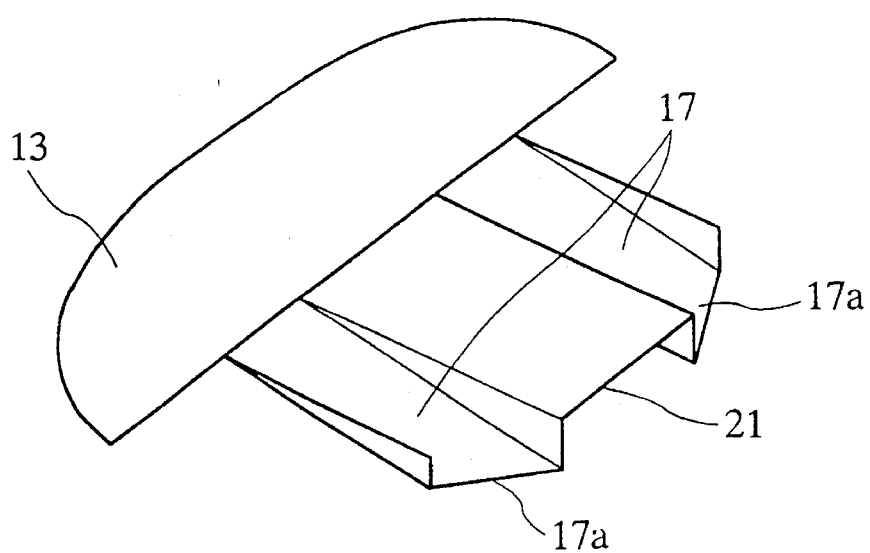
FIG. 6 is a perspective view of an undercover constituting the underfloor structure in accordance with the first embodiment of the present invention.

Since the rear ends 17a of the ducts 17 are cut obliquely so that the outlets face the lateral sides of the vehicle, respectively, the flowing direction of the slow streams U3 are further sifted outside of the vehicle as shown in FIG.5, in comparison with those of the afore-mentioned underfloor structure of FIG.3. Due to their shifting outside, it is possible to decrease the aeromechanic action of the slow streams U3 on the rapid stream U2 flowing along the center line of the vehicle. Consequently, the rapid stream U2, of which velocity is not so influenced by the slow streams U3, can reach up to the rear differential gear 7 without rising the pressure of the stream U2 around the rear differential gear 7, whereby the area B of the rapid stream U2 can be maintained up to the rear end.

On the other hand, due to shifting the direction of the slow streams U3, the areas A occupied therewith expands almost all area of the center floors 3, so that the previous areas C (see FIG.3) occupied with the rapid streams U1 behind the front wheels 19 are reduced considerably. Consequently, the aerial resistance under the floor can be decreased in the areas about the center floors 3.

Furthermore, the previous rapid streams U1 between the respective ducts 17 and the front wheels 19 in FIG.3 are changed to streams U4 which directs about break units inside the respective front wheels 19 since the areas A occupied with the slow streams U3 are expanded, so that the cooling capability against the front brakes can be improved.

In this way, according to the first embodiment of the present invention, since the rear ends 17a face the lateral sides of the vehicle by an oblique cutting form, the areas A occupied with the slow streams U3 are enlarged outsides of the vehicle. Accordingly, the areas C occupied with the rapid streams U1 behind the front wheels 19 are reduced considerably, whereby the aerial resistance under the floor in the areas of the center floors 3 can be decreased. Correspondingly, since the rapid stream U2 can reach up to the rear differential gear 7 without raising or recovering the pressure (negative pressure) of the stream U2, whereby the cooling capability against the rear differential gear 7 can be improved. Moreover, since the rapid streams U1 are introduced in the neighborhood of the front brake units, the cooling capability against the front brakes can be improved.

Figure 7:
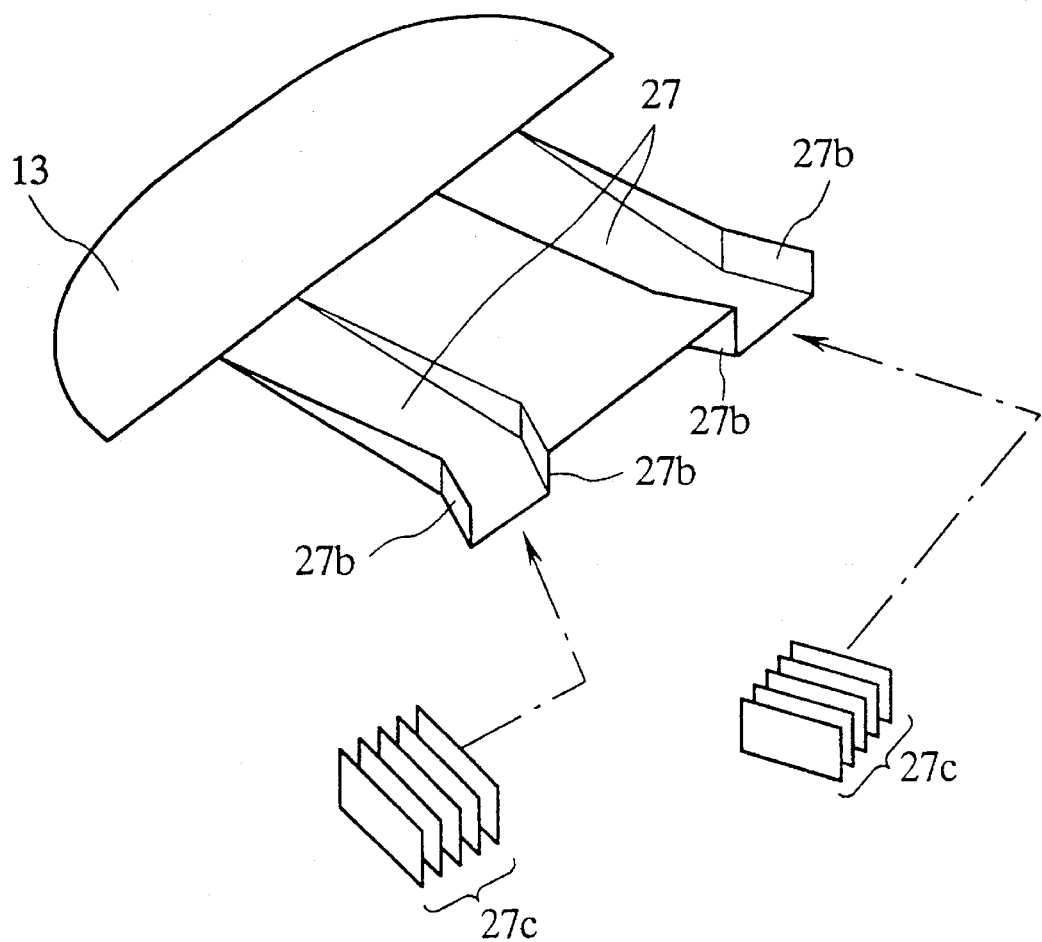
FIG. 7 is a perspective view of an undercover and fins constituting an underfloor structure in accordance with a second embodiment of the present invention.

Next, the second embodiment of the present invention will be described with reference to FIG.7. The differences between ducts 27 of this embodiment and the ducts 17 in the previous embodiment are as follows. As shown in FIG.7, each of the ducts 27 is provided at an outlet thereof with opposite inclination sidewalls 27b which are inclined to the lateral sides of the automobile. Furthermore, each duct 27 is provided between the sidewalls 27b with control fins 27c which regularizes the air flow passing through the duct 27 in order to further increase the directional tendency of the air flow to the outside of the vehicle at the rear section of the vehicle.

Figure 8:
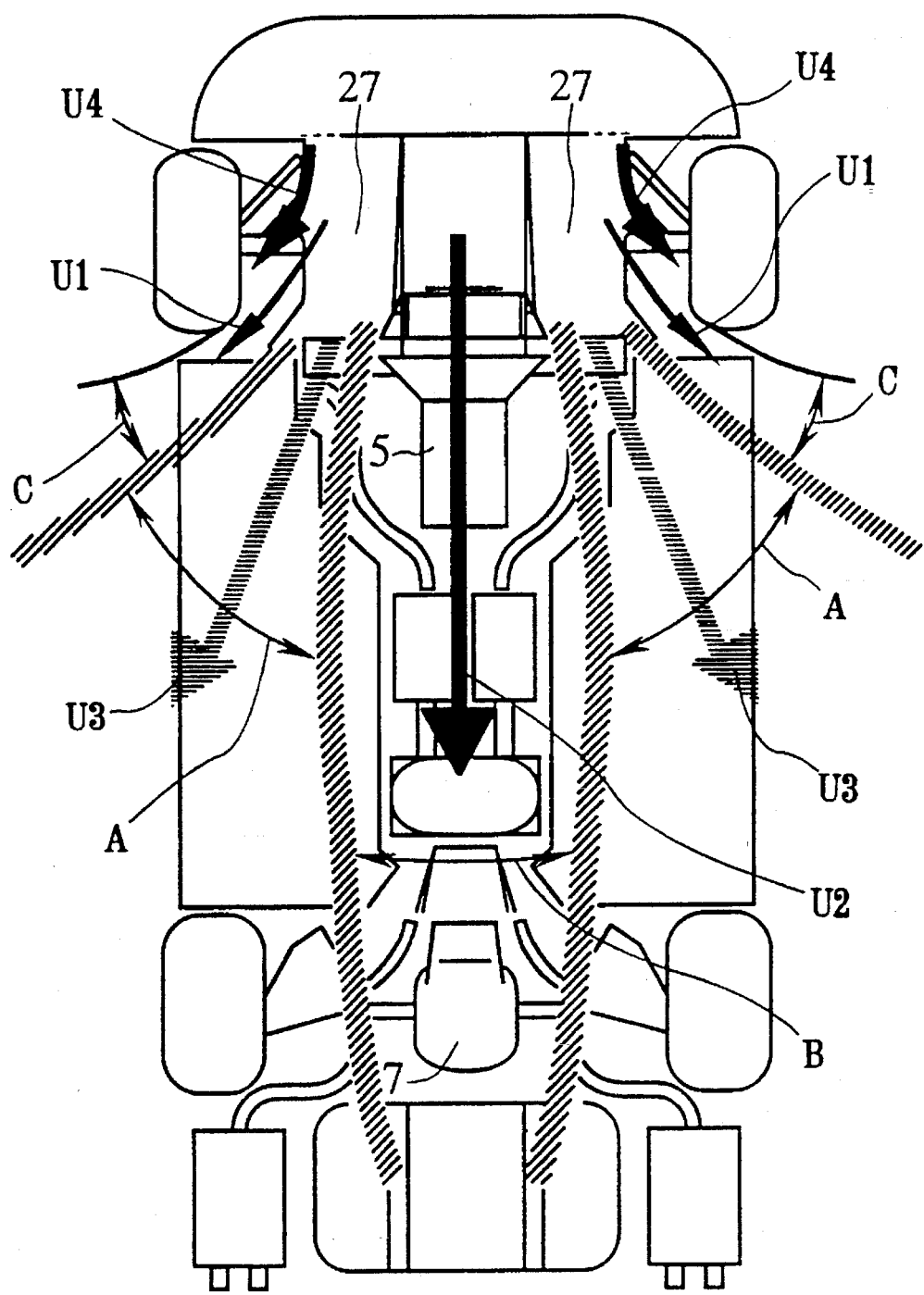
FIG. 8 shows the underfloor structure including a flow-rate distribution of air flows under floors of the vehicle in accordance with the second embodiment of the present invention.

With the arrangement mentioned above, the degree to which the air flow is directed toward the outside can be more developed in comparison with that of the first embodiment. Consequently, as shown in FIG.8, each of the areas A occupied with the slow stream U3 is enlarged in comparison with the area A of the first embodiment.

In this way, according to the second embodiment, since the sidewalls 27b are inclined to develop the outward directional tendency of the air flows, the aerial resistance under the floor can be further decreased while the cooling capability against the transmission 5 and the rear differential gear 7 etc. is further improved in comparison with the first embodiment. Moreover, on condition that the control fins 27c are attached on the outlet of the ducts 27, the directional degree of the air flow becomes to be ideal because of its regulating effect, so that the reduction of the air resistance and the cooling capability against the heat-radiant parts of the vehicle can be progressed. Note that, in one modification, the above control fins 27c may be attached to the oblique rear ends 17a (FIG.6) of the first embodiment. In such a case, it is expected that the outward directional degree derived from the ducts 17 would be progressed.

Figure 9:
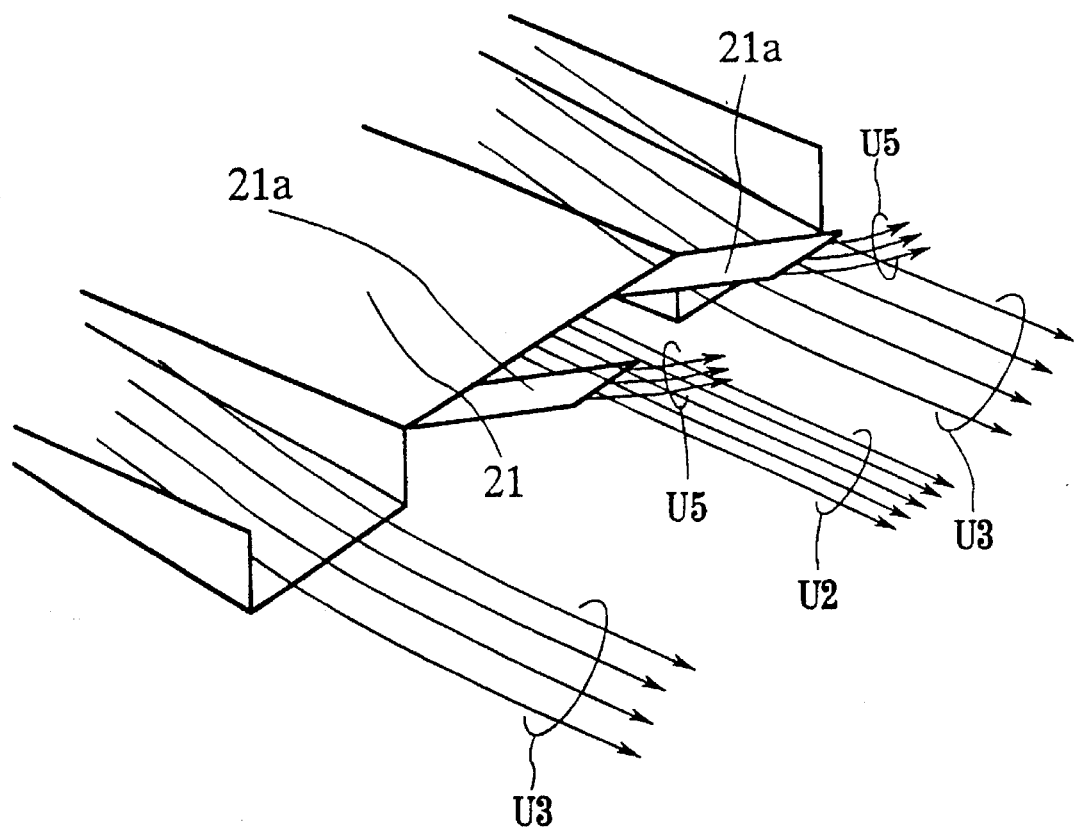
FIG. 9 shows an undercover of an underfloor structure in accordance with a third embodiment of the present invention and air flows passing therethrough.
Figure 10:
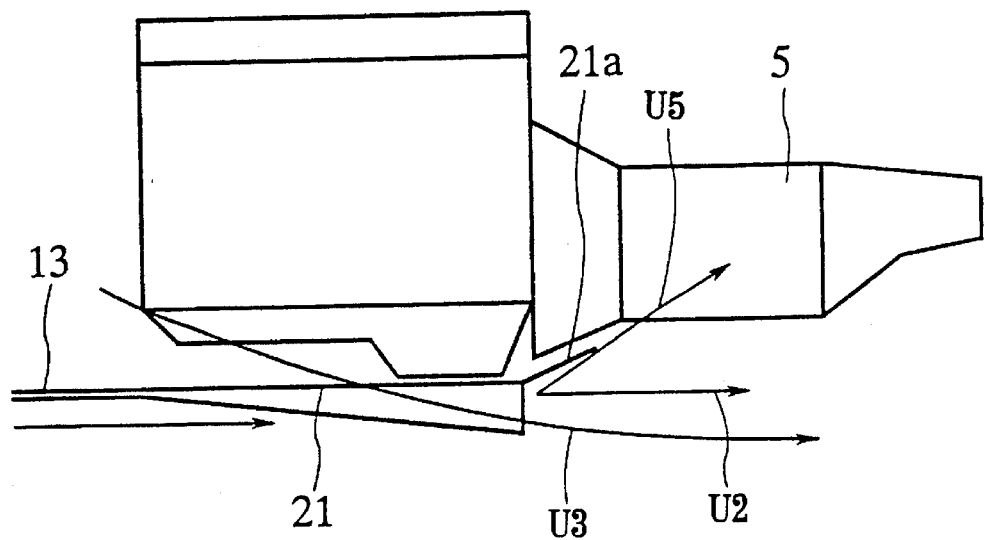
FIG.10 is a side view of the engine and the undercover of FIG.9, in which the air flows passing therethrough are shown.

Then, the third embodiment of the present invention will be described with reference to FIGS.9 and 10. In the embodiment shown in FIG.9, a pair of guide plates 21a (corresponding to guide means) are attached to the rear end of the narrow part 21 to direct the air flow narrowed by the part 21 upward of the vehicle. In a direction of width of the vehicle, the respective guide plates 21a extend in length except a width of the transmission 5 to reach the outer edges of the narrow part 21, respectively. Further, the guide plates 21a are formed obliquely upward to the narrow part 21 at a predetermined angle.

By a provision of the guide plates 21a, left and right parts of the rapid stream U2 narrowed by the narrow part 21 are raised upward along the slanting surfaces of the guide plates 21a to be rapid streams U5. Consequently, the velocity of the wind passing in the vicinity of the transmission 5 existing upward of the automobile is increased, whereby the cooling capability therefor part can be improved.

According to our confirmation test, it has been founded that the velocity of the wind flowing beside the transmission 5 in this embodiment is three times as large as that of the undercover with no guide plates and that a temperature of oil contained in the transmission 5 is reduced with degrees more than 5° C.

In this way, according to the third embodiment of the invention, since the velocity of the wind along the side surfaces of the transmission 5 can be increased by the provision of the guide plates 21a at the rear end of the narrow part 21, the cooling capability against the transmission 5 can be improved moreover.

Figure 11:
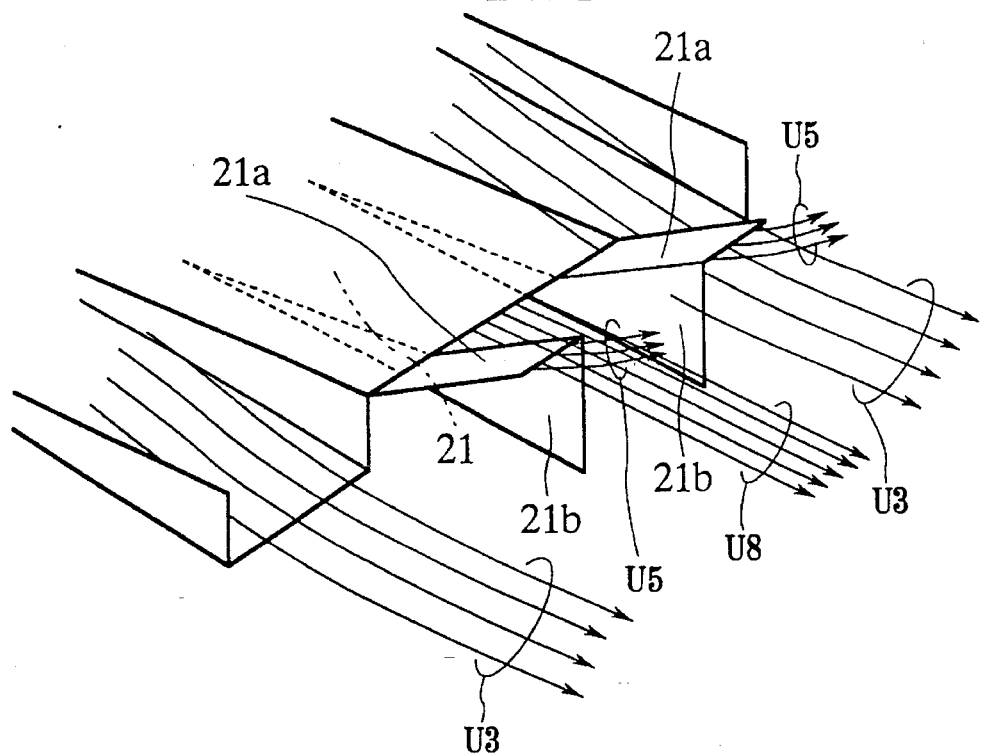
FIG.11 shows an undercover of an underfloor structure in accordance with a fourth embodiment of the present invention and air flows passing therethrough.

The fourth embodiment of the present invention is shown in FIG. 11 where a pair of vertical partitions 21b are secured to the inside edges of the guide plates 21a in the width direction of the vehicle.

Figure 12:
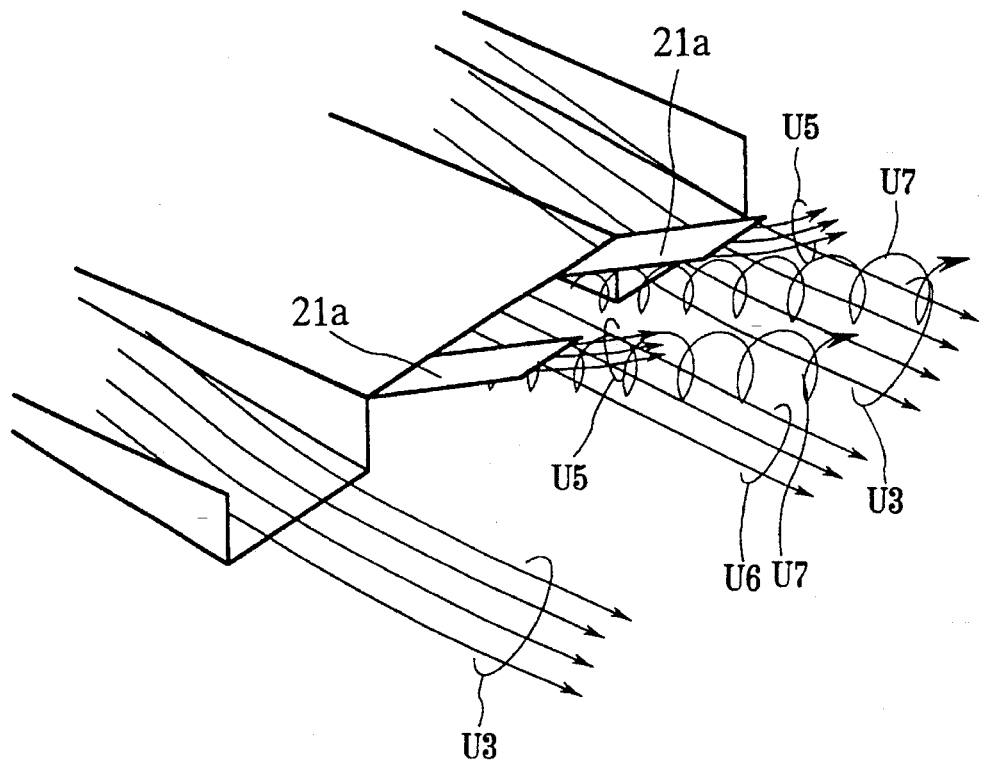
FIG.12 is a perspective view of the undercover in accordance with the third embodiment of the present invention and the air flows passing therethrough.

In operation, by the partitions 21a, the air flows rising toward the side surfaces of the transmission 5 can be separated from the air flow flowing toward the underside of the transmission 5, perfectly. Consequently, it is possible to prevent vortexes of the former air flows from generating in the vicinity of the inside edges of the guide plates 21a. On the contrary, in case that such partitions 21b are not provided as shown in FIG. 12, the rapid stream U8 flowing the underside of the transmission 5 is disturbed by the vortexes U7 so that it is decelerated to a slow stream U6. Therefore, in order to ensure the rapid stream at the center of the vehicle, it is preferable to attach the partitions 21b to the guide plates 21a, respectively.

According to our confirmation test, it has been founded that, in this embodiment, the velocity of the wind under the transmission 5 is substantially equal to that of the undercover without the guide plates 21a.

In this way, according to the fourth embodiment, by a supplement of the partitions 21b, the velocity of the wind under the transmission 5 is increased, whereby the cooling capability of the air flow against the transmission 5 can be improved.

Figure 13:
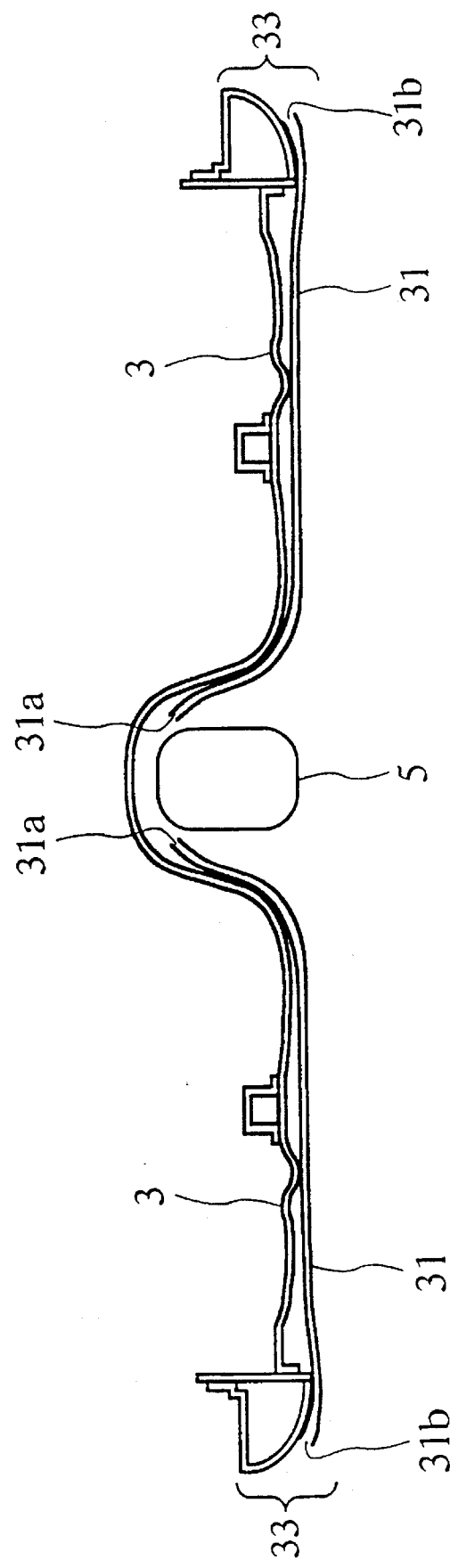
FIG.13 is a front view of an underfloor structure in accordance with a fifth embodiment of the present invention.
Figure 14:
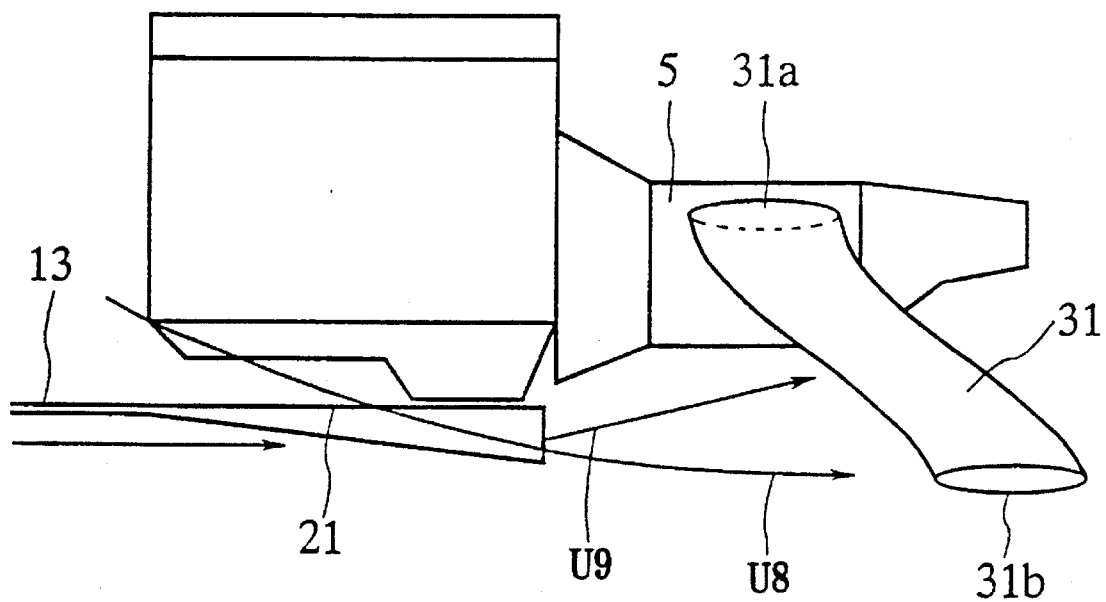
FIG.14 is a side view of the engine and the underfloor structure of FIG. 13, in which air flows passing therethrough are shown.

The fifth embodiment of the present invention will be described with reference to FIGS. 13 and 14. According to the embodiment, a pair of left and right communication pipes (corres. the preventing means) 31 in FIG. 13 are provided in order to prevent the air flow from being apart from the transmission 5. As shown in FIGS. 13 and 14, each of the communication pipes 31 has one opening end 31a which is positioned adjacent the transmission 5 and the other opening end 31b which is positioned adjacent a lateral side 33 of the vehicle.

Due to communicating operation of these pipes 31, it is possible to communicate a space of high pressure adjacent to the transmission 5 with the lateral sides 33 of which air pressure is lower than the pressure of the space. Consequently, the rapid air flow passing through the narrow part 21 is changed to a rapid stream U9 rising toward the transmission 5, whereby the cooling capability of the air flow can be progressed.

In this way, according to the fifth embodiment, by a provision of the communication pipes 31, the air pressure about the transmission 5 can be reduced, so that it is possible to improve the cooling capability of the air flow against the transmission 5.

Figure 15:
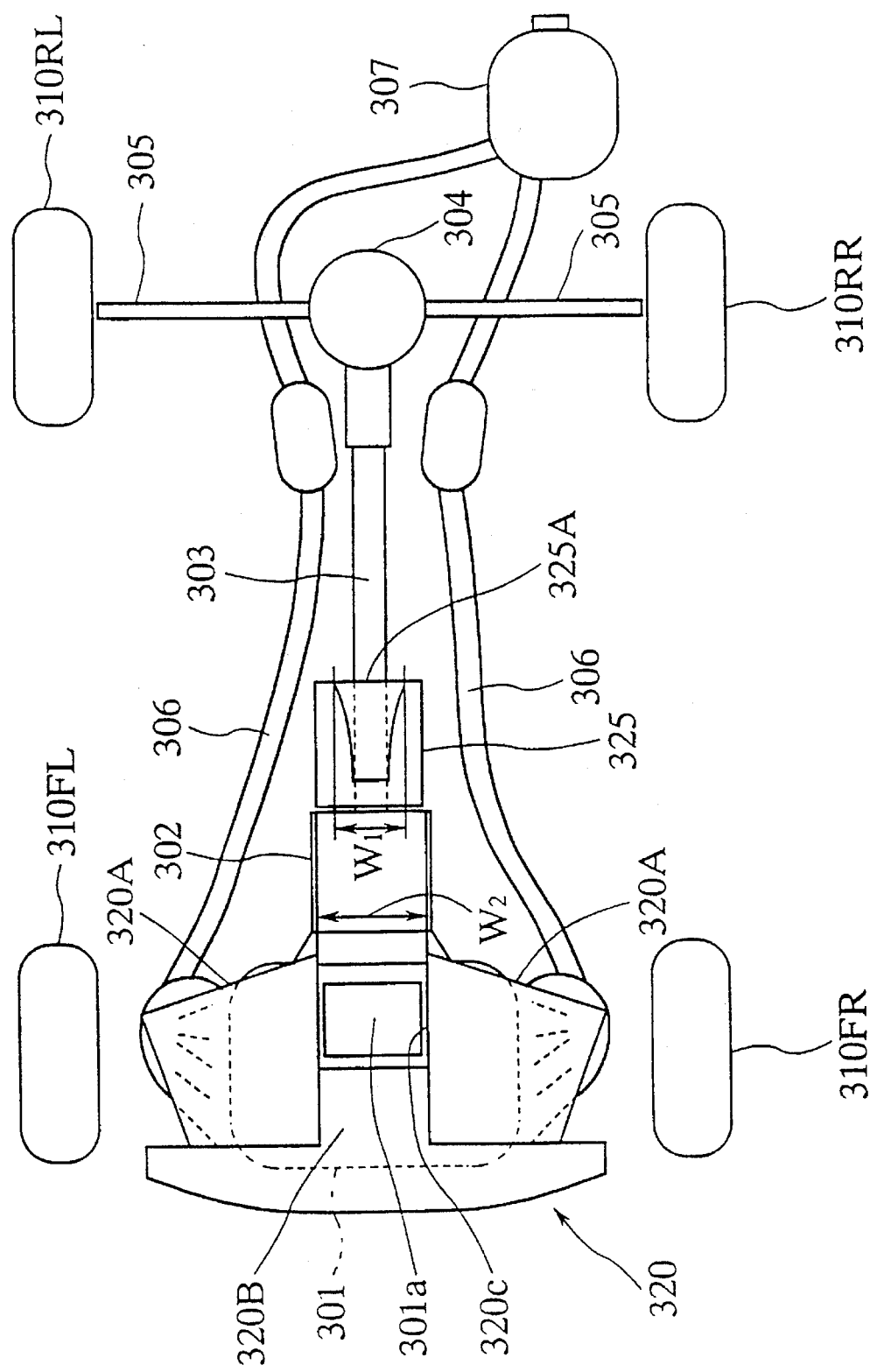
FIG. 15 is a bottom view of an underfloor structure in accordance with a sixth embodiment of the present invention.
Figure 16:
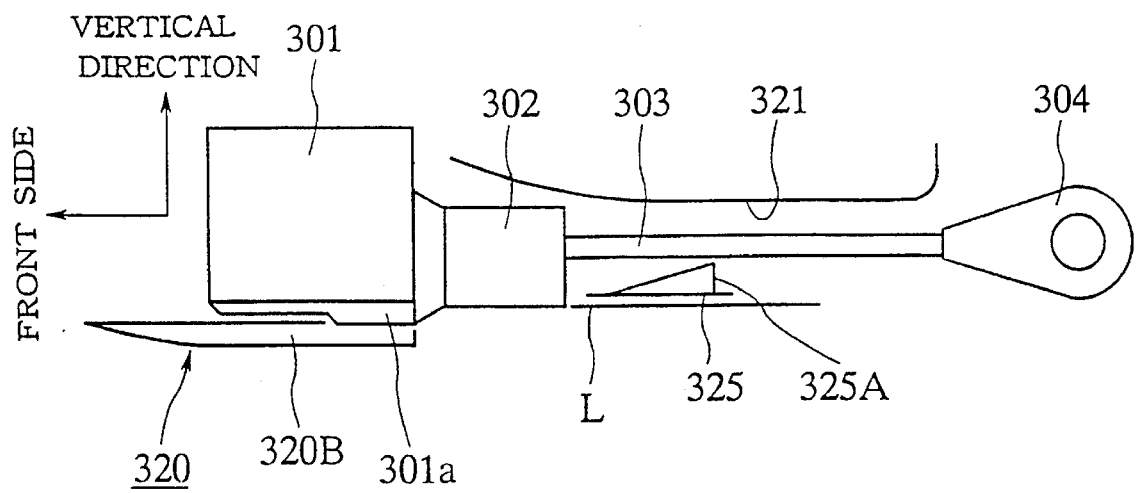
FIG. 16 is a conceptual side view of the underfloor structure in accordance with the sixth embodiment.

The sixth embodiment of the present invention is now described with reference to FIGS. 15 to 18. FIG. 15 is a conceptual bottom view showing a bottom structure of the vehicle and FIG. 16 is a conceptual side view showing the bottom structure.

In FIG. 15, reference numerals 310FL and 310FR denote front wheels of an automobile and numerals 310RL and 310RR rear wheels, respectively. In this automobile, a driving force of an engine 301 is transmitted to the rear wheels 310RL and 310RR through a transmission 302, a driveshaft 303, a differential 304 and a rear axle 305. That is, the automobile in this figure is included in vehicles of FR (front engine rear drive) type. An exhaust pipe 306 connects an exhaust part of the engine 301 to a muffler 307.

Figure 17:
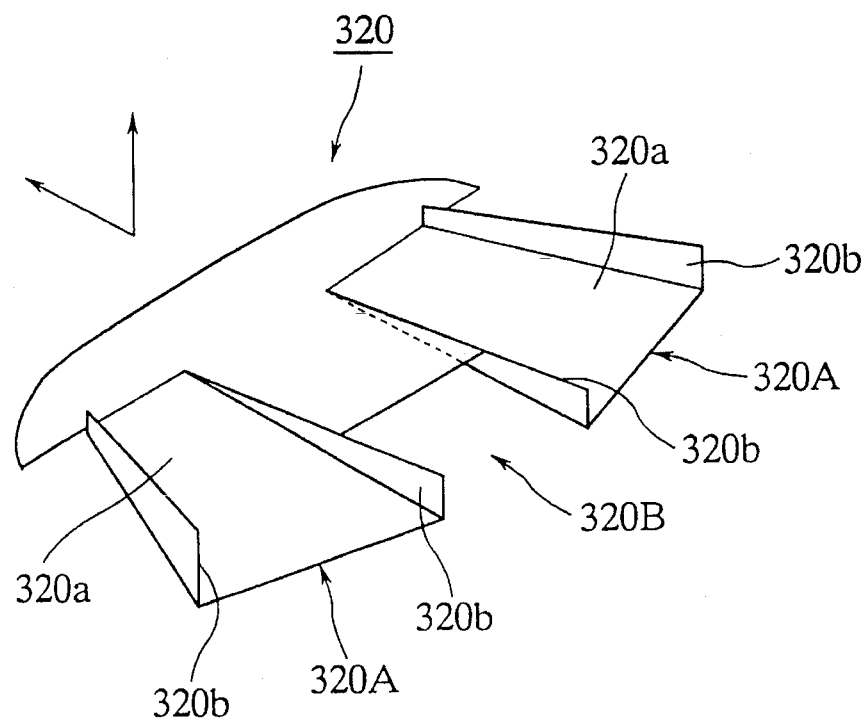
FIG. 17 is a perspective view of an engine undercover of the underfloor structure in accordance with the sixth embodiment.

An undercover 320 is arranged beneath the engine 1 so as to define an engine room in which the engine 1 is accommodated. The undercover 320, which is made of material, such as synthetic resin, steel or the like, is shaped to be substantially flat as shown in FIG. 17 and is fixed generally horizontally to a vehicle body. Further, the undercover 320 is provided with a pair of discharging ducts 320A and a narrow part 320B.

Each of the discharging ducts 320A forms a groove consisting of a bottom part 320a and side parts 320b arranged on both sides thereof. The bottom part 320a is formed in such a manner that the groove becomes to be gradually deep as it approaches the rear side of the vehicle. The discharging ducts 320A, of which upper faces open to an engine room, are inclined outward so that rear openings thereof direct the rear wheels 310RL and 310RR, respectively.

The narrow part 320B, which is defined by the opposite side parts 320b of the ducts 320A, is so formed as to open front, rear and downward and to extend coaxially to a center line of the vehicle, having a width generally equal to the width of the transmission 302. In order to allow an oil in the engine 1 to be exchanged through an oil pan 1a without detaching the undercover 320, an opening 320c is formed in the narrow part 320B in such a manner that the lower face of the engine 1 exposes at the rear of the part 320B.

Figure 18:
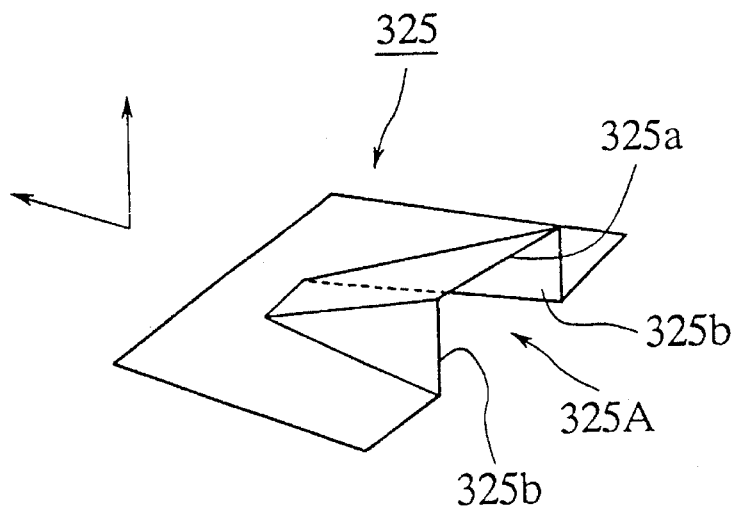
FIG. 18 is a perspective view of a central undercover of the underfloor structure in accordance with the sixth embodiment.

Arranged behind the transmission 302 is a central undercover 325 which covers a part of floor tunnel 321 (see FIG. 16). The floor tunnel 321 is constituted by a groove which extends to the front and rear directions of the vehicle for accommodating the driveshaft 303 therein. The central undercover 325 is also made of synthetic resin, steel or the like. Again, it is shaped to be substantially flat as shown in FIG. 18 and fixed generally horizontally to the vehicle body. The central undercover 325 is provided at the center thereof in the vehicle width direction with an introducing duct 325A extending along the center line of the vehicle, which can be obtained by bending a part of the undercover 325 upward.

The introducing duct 325A, which opens downwardly, consists of an upper part 325a and triangular side parts 825b arranged on both sides thereof. The upper part 325a is slanted so as to rise gradually as it approaches the rear side of the vehicle. Further, the introducing duct 325A is formed to be so-called a NACA-duct configuration in such a manner that its width is gradually increased toward the rear part of the vehicle.

As shown in FIG. 16, the central undercover 325 is arranged at a level higher or equal to a line L representing a height of the lower face of the transmission 302. In addition, as shown in FIG. 15, a maximum width $W_1$ of the introducing duct 325A is established to be less than the width $W_2$ of the narrow part 320B.

The undercovers 320 and 325 of the embodiment operates as follows.

Figure 19:
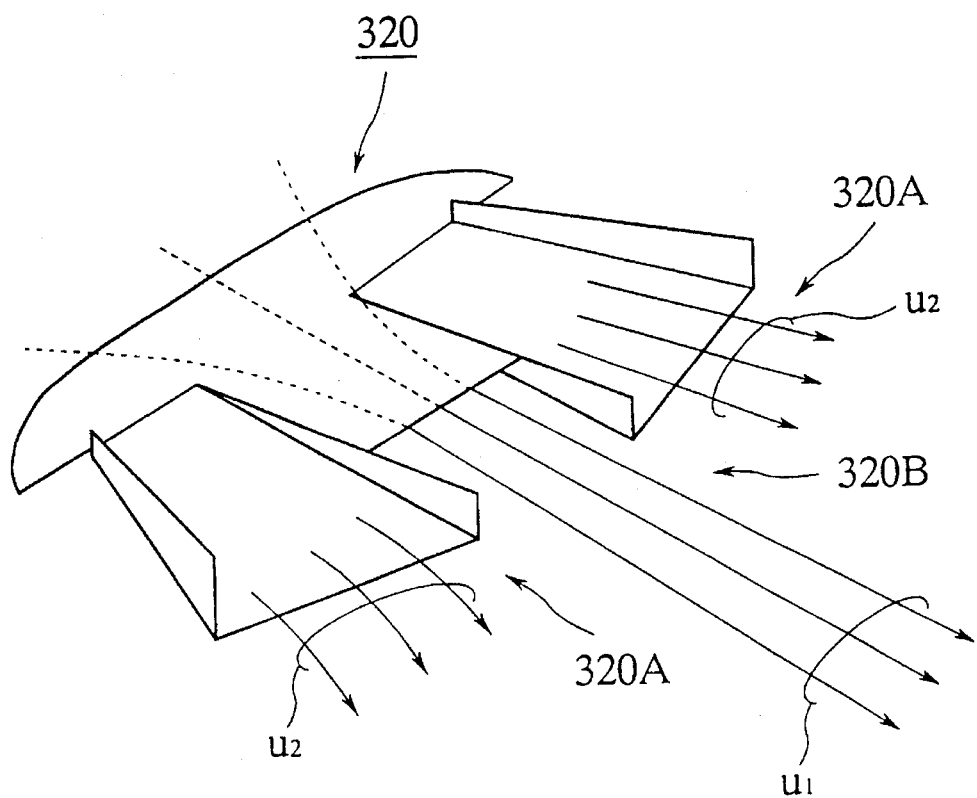
FIG. 19 shows air streams produced by the engine undercover of FIG. 17.

As shown in FIG. 19 in which the air flows during driving caused by the engine undercover 320 are expressed with arrows, since the heated air in the engine room is discharged into an underside of the vehicle floor through the ducts 320A during driving of the vehicle, relatively slow streams $u_2$ of high temperature are produced on the basic points of the respective ducts 320A. Then, since the ducts 320A direct flow to the rear wheels 310RL and 310LL and the width of the narrow part 320B is substantially equal to that of the transmission 302, the respective streams $u_2$ pass apart from the side faces of the transmission 302, so that they reach the rear wheels 310RL and 310LL, respectively, to thereby surround them. Consequently, the aerodynamic force exerted onto the rear wheels 310RL and 310LL can be reduced and thus, the air resistance affecting the vehicle body can be decreased, whereby the fuel consumption of the vehicle can be reduced.

Figure 20:
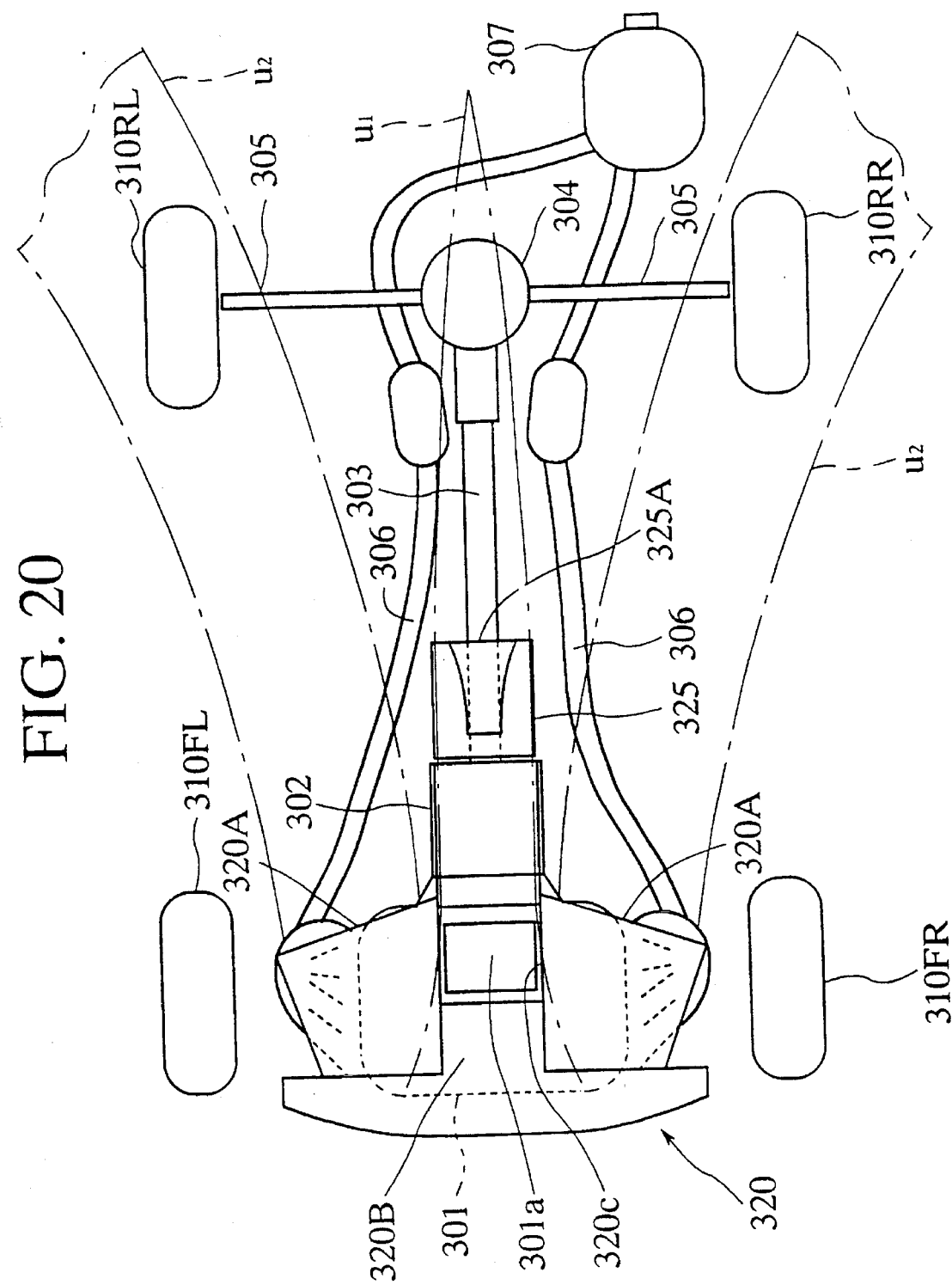
FIG. 20 is, a bottom view showing air streams flowing under the vehicle floor through the engine undercover of FIG. 17.

On the other hand, due to throttle effect at the narrow part 320B and narrowing effects by the slow streams $u_2$, there is produced a relatively rapid stream $u_1$ which flows under the vehicle floor from the front of the vehicle to the rear thereof. This stream $u_1$, which is of relatively low temperature because of its air flow flowing outside the vehicle, flows under the transmission 302 and the differential 304 along the center line of the vehicle as shown in FIG. 20, whereby it allows the transmission 302 and the differential 304 to be cooled efficiently. That is, according to the embodiment, due to the air stream $u_1$ produced by the undercover 320, it is possible to improve the cooling effects on the transmission 302 and the differential 304 as the heat-radiant parts of the vehicle.

Furthermore, according to the embodiment, the interaction of the streams $u_1$ and $u_2$ allows the lifting force exerted on the rear wheels to be decreased considerably. The reason for this decreasing is believed to be that, since the air stream $u_1$ flows straight along the center line while the streams $u_2$ flow toward the rear wheels 310RL and 310LL, respectively, there is generated a depletion area in the vicinity of the rear axle 305, which causes a negative pressure therein.

Figure 21:
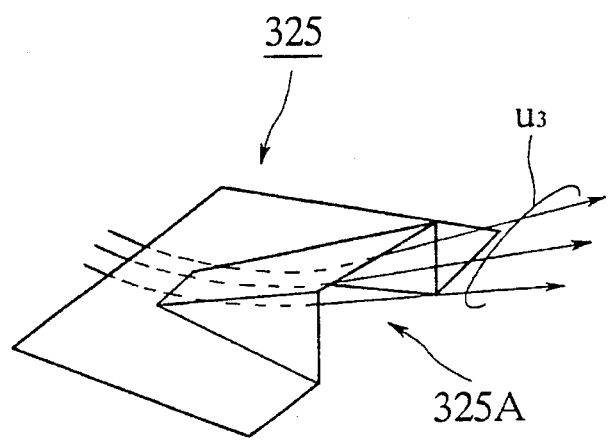
FIG. 21 shows air streams produced by the central undercover of FIG. 18.
Figure 22:
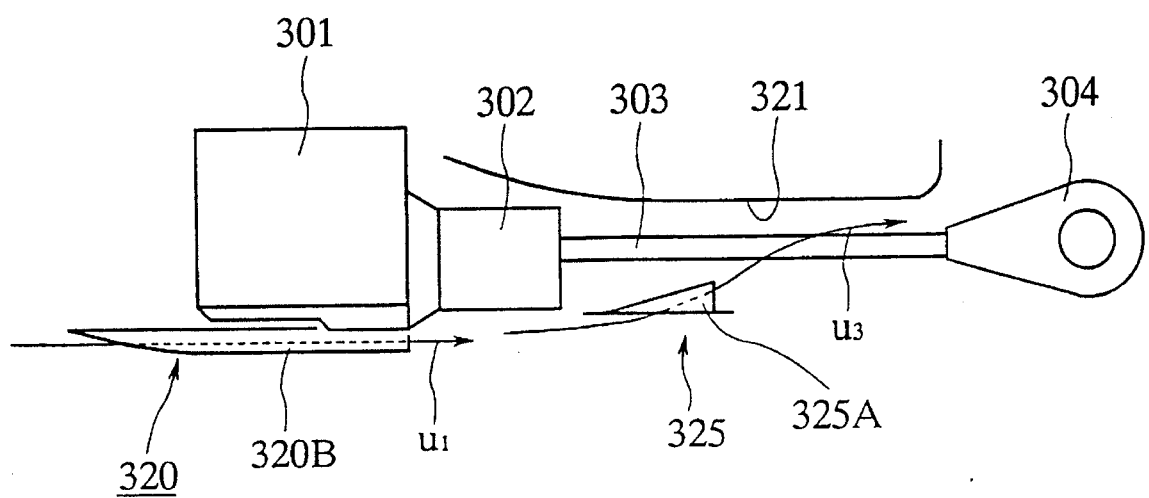
FIG. 22 is a side view showing air streams flowing under the vehicle floor through the central undercover of FIG. 18.

Subsequently, the air stream $u_1$ flows under the central undercover 325 arranged just behind the transmission 302. Since the introducing duct 325A of the undercover 325 is shaped to be of NACA-duct configuration by which the air can be sucked remarkably, a part of the air stream $u_1$ passing under the undercover 325 is raised to the vehicle body side by the introducing duct 325A, whereby an air stream $u_3$ as shown in FIG. 21 is produced. Further, since the rear portion of the introducing duct 325A is formed to be directed obliquely upward, the air stream $u_3$ flows into the floor tunnel 321 rearward to reach an upper face of the differential 304 as shown in FIG. 22. Then, since the velocity of the stream $u_3$ is similar to that of each streams $u_1$, the stream $u_3$ is discharged outside the floor tunnel 321, riding past the differential 304 without aerial hesitation. Consequently, it is possible to prevent the heated air, which has been transferred from the engine room to the differential 304 through the floor tunnel 321, from stagnating above the differential 304.

In other words, since the air stream $u_3$ due to the introducing duct 325A flows along the upper face of the differential 304 as one of the heat-radiant parts and the temperature of the stream $u_3$ is relatively low as similar to that of the stream $u_1$, such an arrangement allows the differential 304 to be cooled down from the upper side thereof efficiently.

In this way, according to this embodiment, it is possible to improve the cooling effect of the air stream on both sides of upper and lower portions of the differential 304, so that the atmospheric temperature thereof is reduced to thereby lower the temperature of oil contained therein to a considerable extent.

Figure 23:
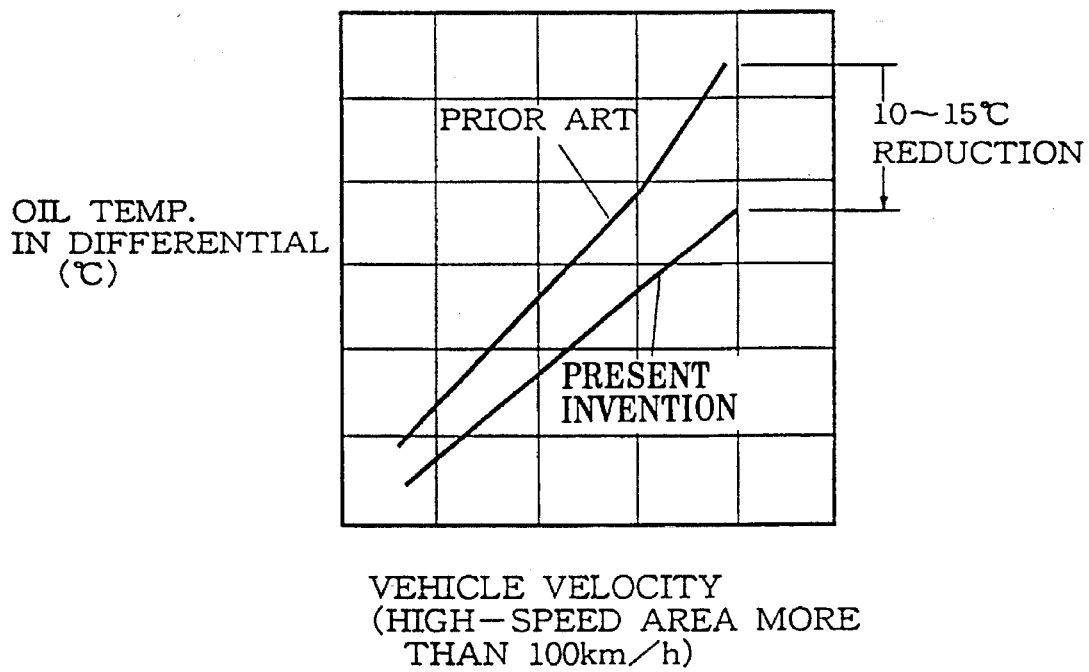
FIG. 23 is a diagram showing an effect of the sixth embodiment in a relationship between an oil temperature and vehicle velocity.
Figure 24:
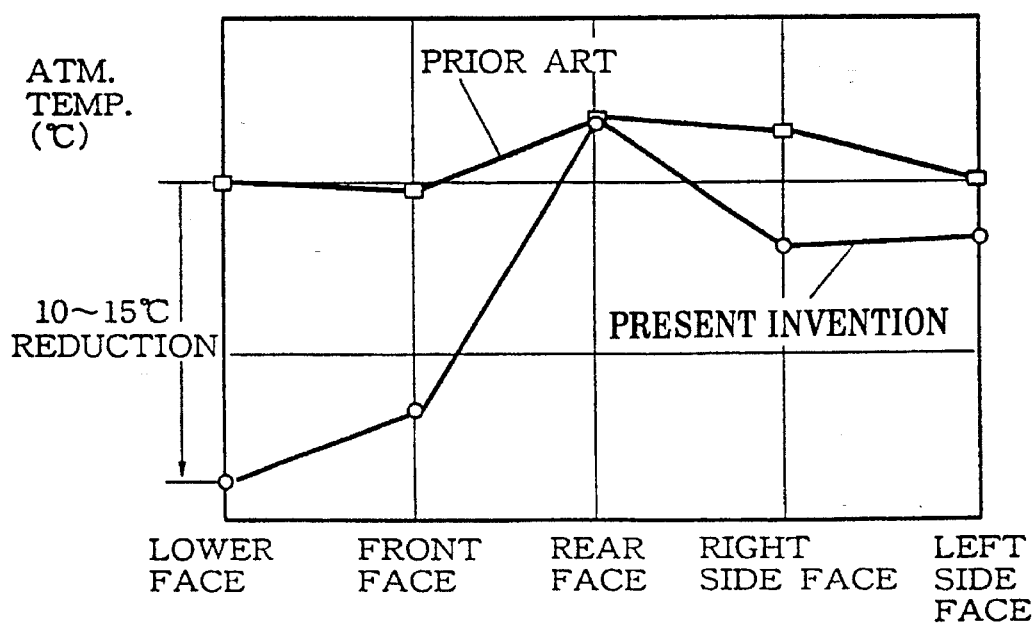
FIG. 24 is a diagram showing an effect of the sixth embodiment in terms of an atmospheric temperature.
Figure 25:
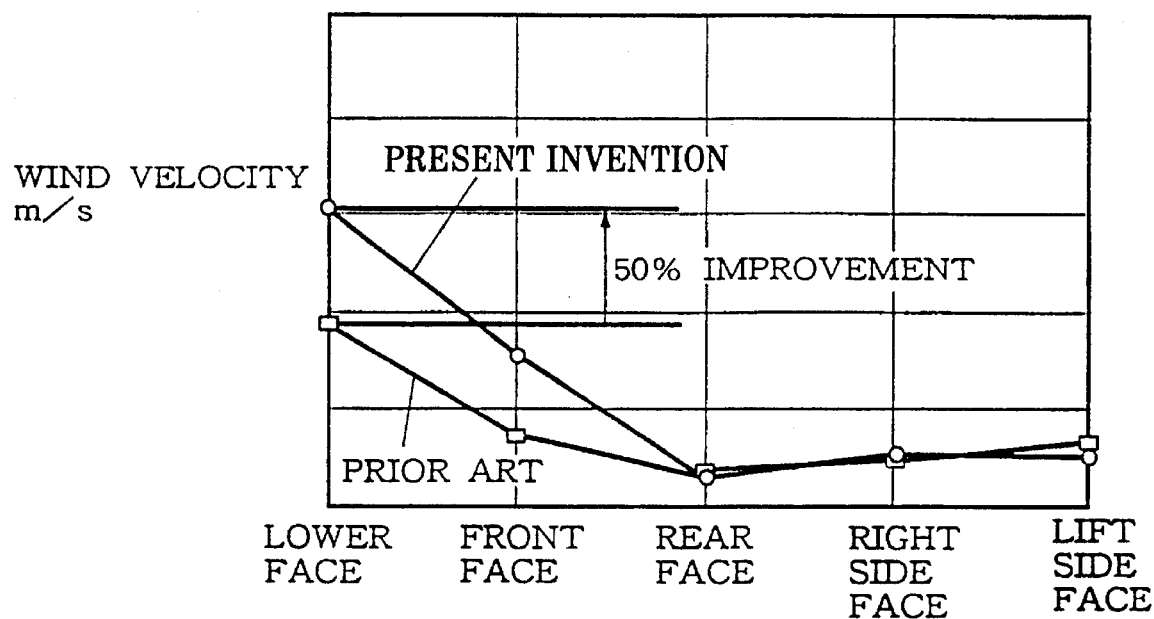
FIG. 25 is a diagram showing an effect of the sixth embodiment in terms of a wind velocity.

FIGS. 23 to 25 show various changes of the oil temperature in the differential 304, the atmospheric temperature thereof and the winds velocity thereabout in comparison with these characteristics of the conventional structure equipped with no central undercover 325, respectively. As shown in FIG. 23, in this embodiment, there can be obtained a reduction in the oil temperature to the extent of 5~10° C. in the high speed area more than 100 km/h, in comparison with the conventional structure. It will be easily understood from FIGS. 24 and 25 that this reduction is derived from the decreasing of the atmospheric temperature of the differential 304 and the rising of the winds velocity thereabout. In other words, by a provision of the central undercover 325 producing the air stream $u_3$ positively, the cooling action to the differential 304 can be remarkably effected. Furthermore, since the width $W_1$ of the introducing duct 325A is less than the width $W_2$ of the narrow part 320B, it is possible to put the whole introducing duct 325A in the air stream 325A. Therefore, such an arrangement allows the air stream $u_3$ to be produced certainly, whereby it is possible to obtain the cooling effect on the upper face of the differential 304 certainly.

In the embodiment, since the central undercover 325 is arranged horizontally in such a manner that the lower surface thereof is above the lower face (line L) of the transmission 302 arranged in the front of the undercover 325, the air stream $u_1$ cannot be disturbed by a provision of the undercover 325, so that the above mentioned cooling effect can be maintained. Note that, in another form of the embodiment, the central undercover 325 may be arranged so that the level of the lower face thereof is substantially equal to the level of the line L.

Further, since the afore-mentioned embodiment employs the structure which can discharge the heated air in the engine room obliquely upward through the ducts 320A formed in the engine undercover 320, the air streams $u_2$ can flow toward the rear wheels 310RL and 310LL without stagnating beneath the engine undercover 301 even when the vehicle is under the traffic retardation. Therefore, it is possible to prevent the heated air which has been discharged once, from heating a not shown radiator. It should be noted that the arrangement of the embodiment does not cause a great increase in manufacturing cost since the undercover 320 is not made of particularly expensive material.

Figure 26:
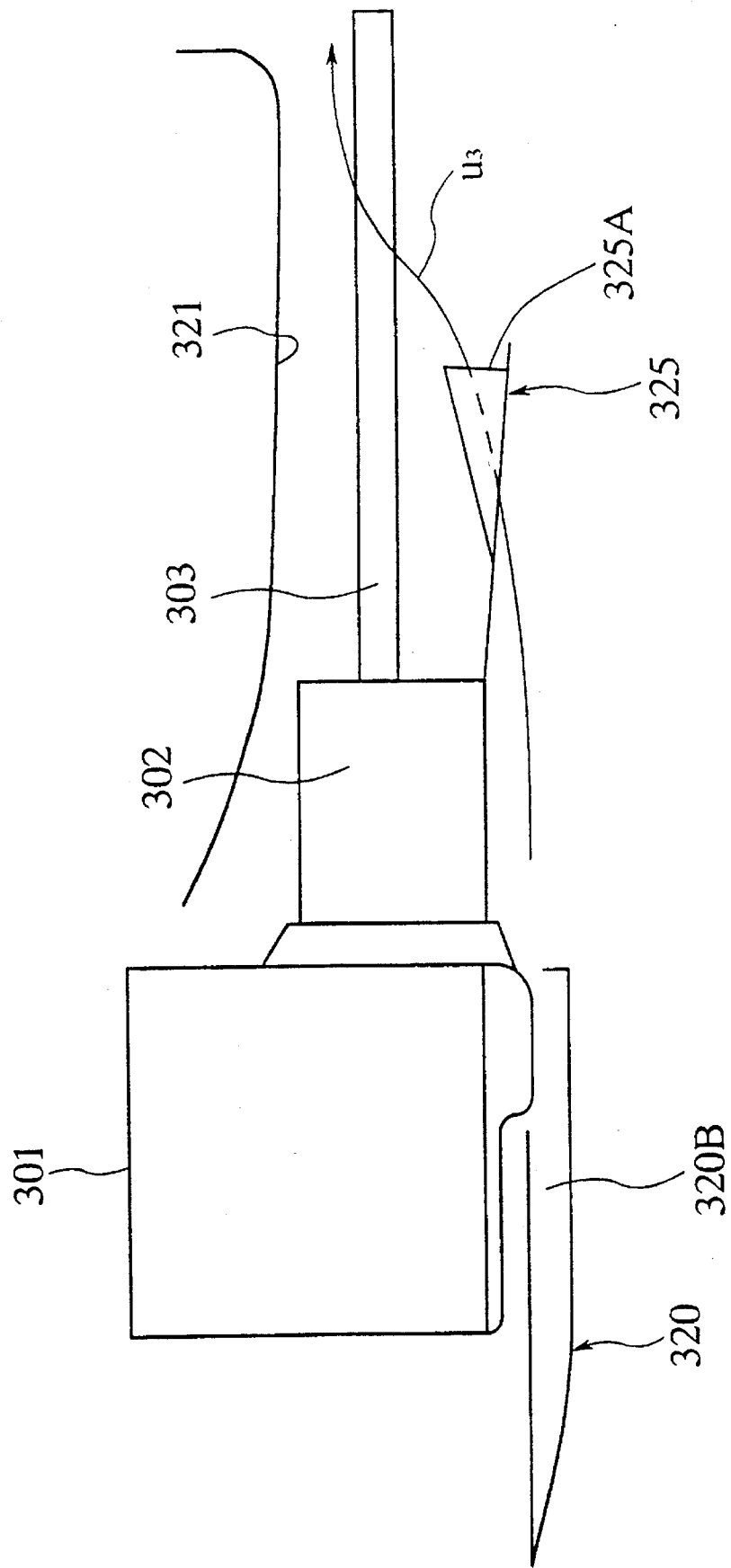
FIG. 26 is a conceptual side view of an underfloor structure in accordance with a seventh embodiment.
Figure 27:
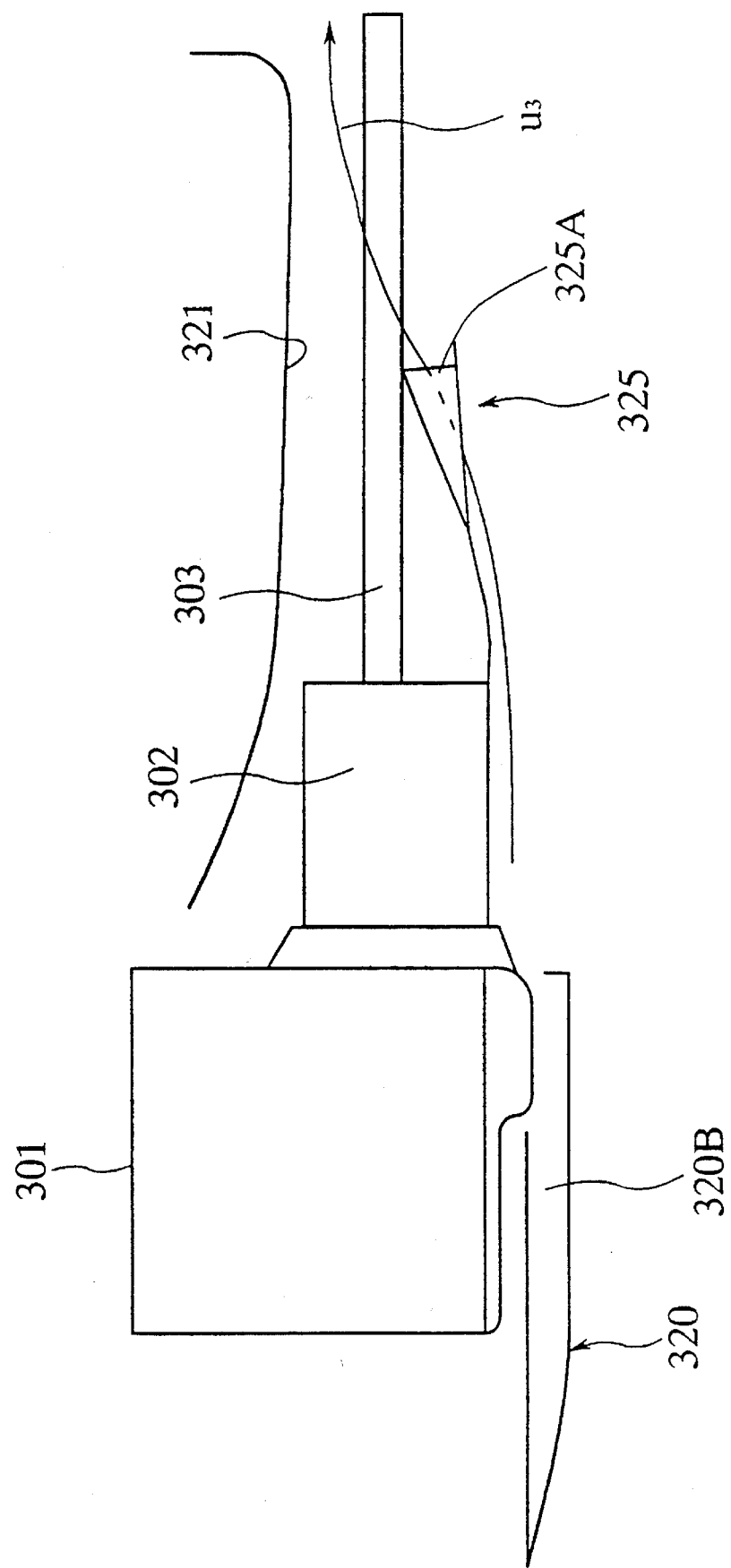
FIG. 27 is a conceptual side view of the underfloor structure in accordance with the seventh embodiment.

FIGS. 26 and 27 show the seventh embodiment of the invention, as similarly to FIG. 16 of the sixth embodiment. Note that, in this embodiment, elements similar to those of the sixth embodiment are indicated by the same reference numerals and their respective overlapped descriptions are eliminated. Further, other elements, which are not shown in the figures, are similar to those of the sixth embodiment, respectively.

This embodiment has features that the central undercover 325 is arranged so that a frontal end thereof is level with the lower face of the transmission 302 and that the undercover 325 is connected to the transmission 302.

With the above mentioned arrangement, even when the central undercover 325 is attached obliquely to the transmission 302 by mistake or even if the former is bent obliquely to the latter by an external shock, such as jumping stones, in spite of its horizontal attach at the beginning, the air flow flowing under the vehicle floor would not be disturbed by the central undercover 325. Consequently, it allows the air stream $u_3$ to be introduced into the floor tunnel 321 certainly, whereby such a cooling effect as mentioned in the sixth embodiment can be obtained surely.

Figure 28:
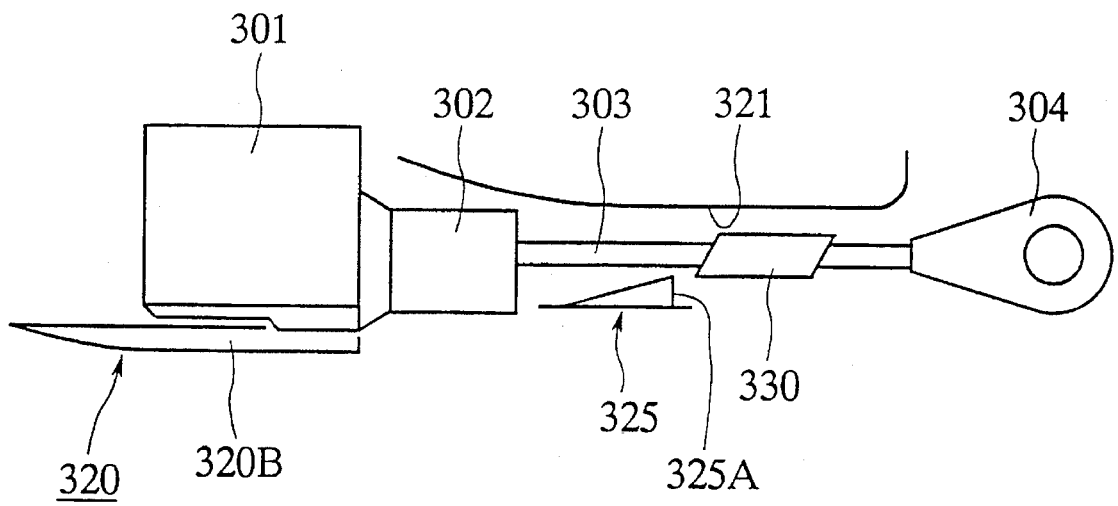
FIG. 28 is a conceptual side view of an underfloor structure in accordance with a eighth embodiment.
Figure 29:
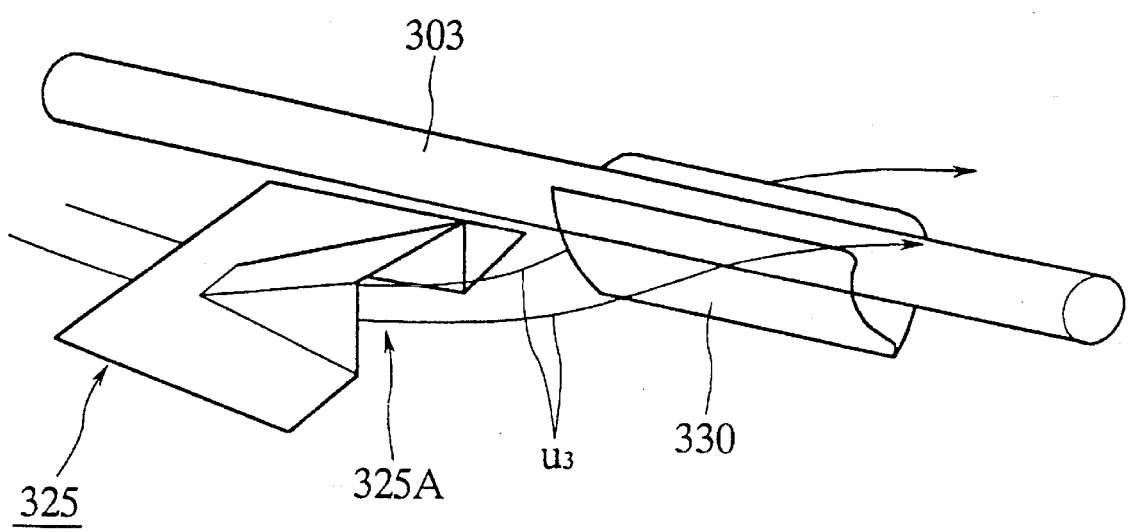
FIG. 29 is a conceptual perspective view of the underfloor structure in accordance with the eighth embodiment.

FIGS. 28 and 29 are views of the eighth embodiment of the invention, in which FIG. 28 similar to FIG. 16 of the sixth embodiment is a conceptual side view showing the structure on the bottom side of the vehicle and FIG. 29 is a perspective view showing essential parts of this embodiment. Also in this embodiment, not-shown other elements are similar to those of the sixth embodiment.

Under condition that there exists a rotating shaft, such as the driveshaft 303, in the floor tunnel 321, it is assumed that the air stream $u_3$ introduced thereinto by the central undercover 325 is disturbed by the rotation of the driveshaft 303, so that the cooling effect on the differential 304 is decreased. In order to solve such a problem, according to the embodiment, a pail-shaped air guide 330, of which upper side opens, is arranged so as to surround a part of the driveshaft 303, against which the air stream $u_3$ strikes.

With the above mentioned arrangement, since the air stream $u_3$ enters into the floor tunnel 321 certainly without being disturbed by the rotation of the driveshaft 303, the cooling action on the differential 304 described in the sixth embodiment can be further effected.

Figure 30:
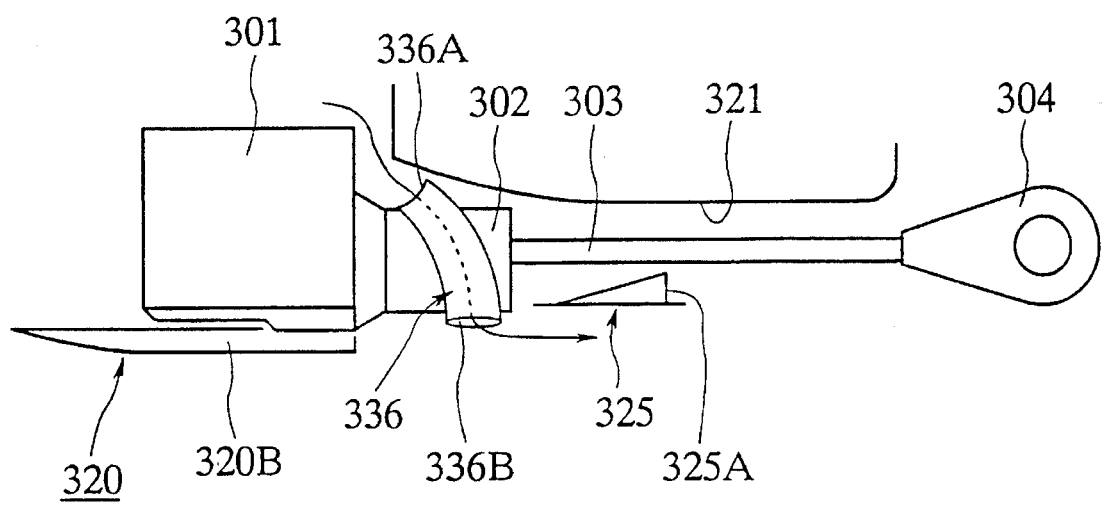
FIG. 30 is a conceptual side view of an underfloor structure in accordance with a ninth embodiment.
Figure 31:
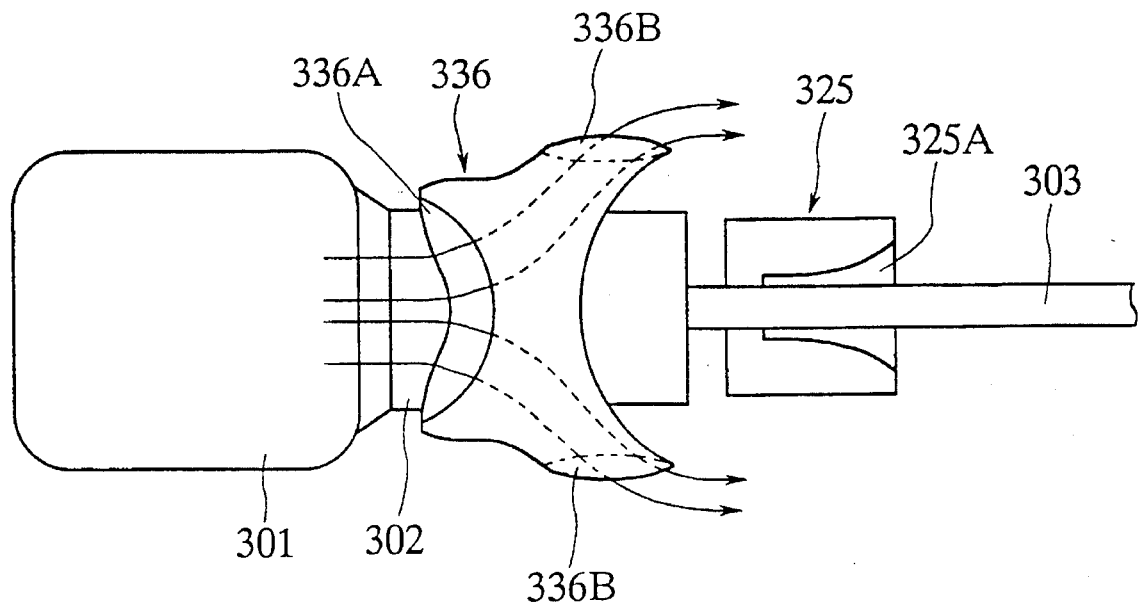
FIG. 31 is a conceptual plan view of the underfloor structure in accordance with the ninth embodiment.

FIGS. 30 and 31 are views of the ninth embodiment of the invention, in which FIG. 30 similar to FIG. 16 of the sixth embodiment is a conceptual side view showing the structure on the bottom side of the vehicle and FIG. 31 is a plan showing essential parts of this embodiment. Also in this embodiment, not-shown other elements are similar to those of the sixth embodiment.

In the embodiment, a communication pipe 336 is provided to communicate a space behind the engine 301 with spaces under both sides of the transmission 302. The communication pipe 336 has a forked configuration so as to lay across the transmission 302 and is provided at an upper end thereof facing the engine room with a suction inlet 336A of which width is larger than the transmission 302 a little. On the other hand, the pipe 336 is provided, at respective lower ends thereof under both of the sides of the transmission 302, with outlets 336B which direct obliquely outward.

With such an arrangement, since the heated air above the engine 301 is discharged into the spaces under the sides of the transmission 302 through the communication pipe 336, it is possible to prevent the heated air from flowing to the differential 304. Consequently, the cooling action of the differential 304 can be more effected and the heating action of the heated air discharged from the engine room to the transmission 302 can be restricted. Furthermore, since the outlets 336B of the communication pipe 336 are positioned so as to direct obliquely outward under both sides of the transmission 302, there is not caused such an inconvenience that the heated air discharged fron the outlets 336B is sucked into the introducing duct 325A of the central undercover 325 to be introduced into the floor tunnel 321. The other operational effects of this embodiment are similar to those of the sixth embodiment.

Figure 32:
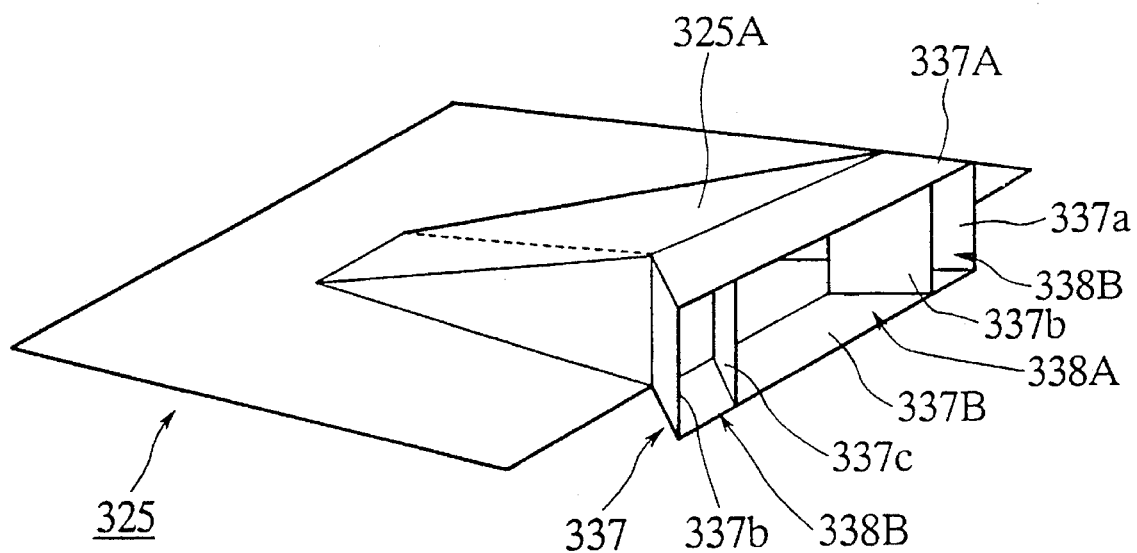
FIG. 32 is a perspective view of a central undercover of an undercover structure in accordance with a tenth embodiment.
Figure 33:
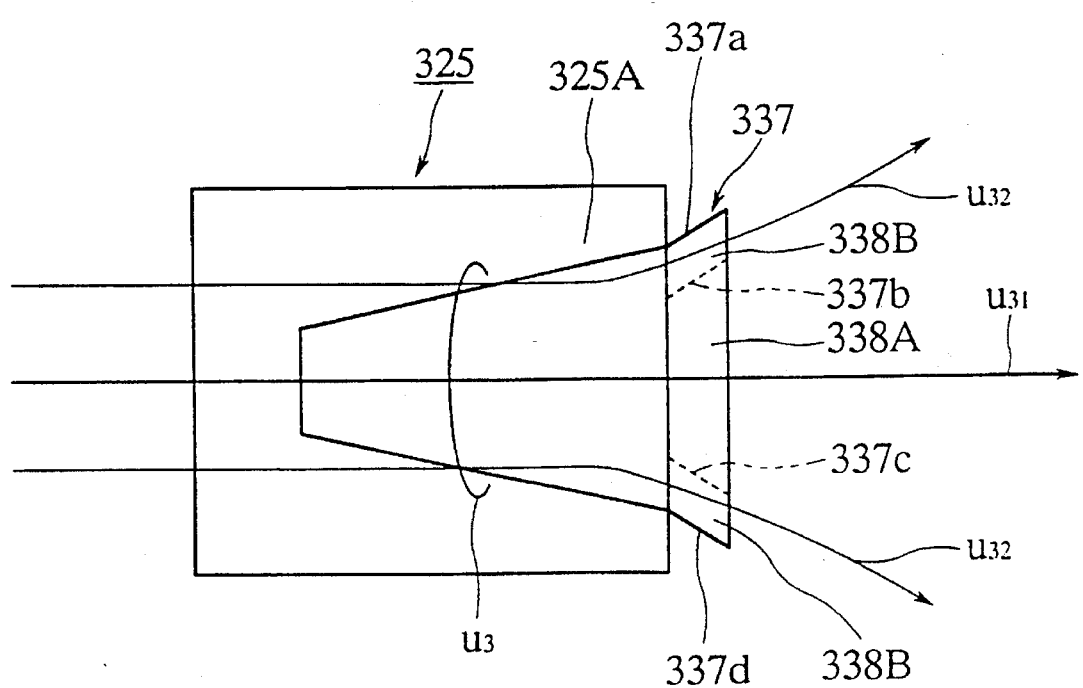
FIG. 33 is a bottom view of the central undercover of FIG. 32.

FIGS. 32 and 33 are views showing the tenth embodiment of the invention, in which FIG. 32 is a perspective view of the central undercover 325 and FIG. 33 is a bottom view thereof. Also in this embodiment, not-shown other elements are similar to those of the sixth embodiment.

Although the central undercover 325 is substantially the same as that of the sixth embodiment in view that the introducing duct 325A of NACA-duct configuration is formed at the center of the undercover 325, the duct 325A is provided at a rear end thereof with an air duct 337 which controls the direction of the air flow discharged from the duct 325A.

The air duct 337 is constituted by a pair of flat plates 337A and 337B arranged on upper and lower edges of the outlet of the introducing duct 325A and four vertical plates 337a to 337d arranged between the flat plates 337A and 337B. In the embodiment, a distance between the vertical plates 337a and 337b and a distance between the vertical plates 337c and 337d are established to be of about ⅕ to ⅙ of the width of the flat plate 337A (337B). Further, in order not to prevent the air stream $u_3$ from rising, at least the upper flat plate 337A is fixed to the duct 325A so that a rear part of the plate 337A is inclined upward a little.

That is, the air guide 337 is provided at a center thereof in the direction of width with a duct 338A of which rear opening diverges in the direction of width of the vehicle and provided at both sides of the duct 338A with ducts 338B which face outward in the same direction.

With the arrangement mentioned above, as shown in FIG. 33, when the air stream $u_3$ from the duct 325A reaches the air duct 337, an intermediate portion of the stream $u_3$ passes through the duct 338A to be an air stream $u_{3\ 1}$ which would be introduced into the floor tunnel without deviating from the vehicle center line. On the other hand, passing through the ducts 338B, side portions of the stream $u_3$ are changed to air streams $u_{3\ 2}$ which are inclined outward in the width direction of the vehicle, respectively. Consequently, since these air streams $u_{3\ 2}$ are brought into contact with both side faces of the differential 304, cooling winds can be supplied to all faces of the differential 304, the cooling action thereon can be further effected. Note that, the other operational effects of this embodiment are similar to those of the sixth embodiment.

Although there are disclosed a variety of structures which are directed to cool the differential 304 as the heat-radiant part effectively in the above mentioned embodiments, i.e, the 6th to 10th embodiments, an object to be cooled by the present invention is not limited to only the differential 304. For example, by adjusting an opening direction of either the introducing duct 325A or the air duct 337 properly, the air stream $u_3$ may be directed to other heat-radiant parts to be cooled, such as a fuel tank.

Further, in the afore-mentioned embodiments, although the engine undercover 320 is arranged in addition to the central undercover 325, the former may be eliminated in the other form of the embodiment. In such a case, it is assumed that, since the air flow flowing under the vehicle floor at driving is guided upward by the introducing duct of the central undercover 325, the cooling capability may be decreased a little in comparison with cases of provision of the engine undercover 320. However, in even that case, it is possible to obtain the cooling effect similar to those in the above embodiments.

Furthermore, although there is provided only one central undercover 325 in each embodiment, a plurality of the undercover may be arranged in the direction before and behind the vehicle and/or in the width direction thereof.

What is claimed is:

1. An underfloor structure for an automobile, comprising:
    an undercover for closing an underside of an engine compartment disposed in a front section of said automobile, said undercover having a pair of discharging parts arranged symmetrically of a center line of said automobile, said discharging parts communicating with said engine compartment for discharging a flow of heated air therefrom toward rear wheels of said automobile, a narrow part arranged between said discharging parts to narrow an air flow flowing from a front of said automobile along an underside of a floorboard of the automobile thereby discharging the air flow toward a transmission and a rear differential gear located under a floor of said automobile and behind said engine compartment, and at least one air flow control means disposed in a rear part of said undercover for controlling an air flow thereat, said air flow control means consisting of control means for controlling the heated air flow direction to prevent a pressure rise of an air flow under said automobile, guide means for guiding the air flow flowing out from said narrow part to an upward part of an underfloor of said automobile, and preventing means for preventing a separation of the air flow discharged from said narrow part away from said transmission and said rear differential gear.

2. An underfloor structure for an automobile as claimed in claim 1, wherein said pair of discharging parts are formed to have outlets facing lateral sides of said automobile, respectively, and wherein said pair of discharging parts are formed to constitute said control means.

3. An underfloor structure for an automobile as claimed in claim 1, wherein said pair of discharging parts are provided with inclined sidewalls which are inclined to the lateral sides of said automobile and said inclined sidewalls constitute said control means.

4. An underfloor structure for an automobile as claimed in claim 2, wherein said pair of discharging parts are provided with respective control fins for directing the air flow from said discharging parts to corresponding lateral sides of said automobile.

5. An underfloor structure for an automobile as claimed in claim 1, wherein said guide means comprises guide plates provided at a rear end of said narrow part and arrayed across a width thereof except in a region corresponding to said transmission said guide plates being inclined relative to said narrow part so as to shift a direction of the air flow from said narrow part upward.

6. An underfloor structure for an automobile as claimed in claim 5, wherein said guide plates are each provided at least one of inside edges thereof in a direction of a width of said automobile, with a partition which extends along a flowing direction of an air flow introduced into said narrow part to divide said air flow into a first air flow upward of said automobile and another air flow.

7. An underfloor structure for an automobile as claimed in claim 1, wherein said preventing means comprises a communication pipe which communicates a space adjacent to said transmission with another space of which an air pressure is lower than that in said former space.

8. An underfloor structure for an automobile as claimed in claim 1, wherein said vehicle floor is provided with a floor tunnel which extends in a fore-and-aft direction of said automobile, and wherein said guide means comprises a central undercover arranged behind said narrow part, said central undercover having an introducing duct for directing the air flow flowing from said narrow part upward.

9. An underfloor structure for an automobile as claimed in claim 8, wherein said introducing duct has a width narrower than a width of an outlet of said narrow part.

10. An underfloor structure for an automobile as claimed in claim 8, wherein said central undercover is arranged in such a manner that a level of a front end part thereof is not lower than a level of a lower face of said transmission arranged behind said engine compartment.

11. An underfloor structure for an automobile as claimed in claim 10, wherein said lower face of said transmission is continuous with a lower face of said central undercover.

12. An underfloor structure for an automobile as claimed in claim 8, wherein said introducing duct is shaped in accordance with duct configuration authorized by the National Advisory Committee for Aeronautics.

13. An underfloor structure for an automobile as claimed in claim 8, wherein said floor tunnel accommodates a driveshaft for transmitting an output of said engine and an air guide is provided for surrounding a part of said driveshaft.

14. An underfloor structure for an automobile as claimed in claim 8, further comprising a communication pipe for communicating a space in said engine compartment with a space in the vicinity of side faces of said transmission.

15. An underfloor structure for an automobile as claimed in claim 8, wherein said introducing duct is provided at a rear end thereof with an air-guide member for controlling the flowing direction of air flow which passes through said introducing duct.

* * * * *